US005642888A

United States Patent [19]

Rockwood

[11] Patent Number: 5,642,888
[45] Date of Patent: *Jul. 1, 1997

[54] TEMPERATURE AND PRESSURE RESISTANT ROTATING SEAL CONSTRUCTION FOR A PUMP

[75] Inventor: Robert E. Rockwood, Windham, N.H.

[73] Assignee: Environamics Corporation, Hudson, N.H.

[*] Notice: The term of this patent shall not extend beyond the expiration date of Pat. No. 5,553,867.

[21] Appl. No.: 570,001

[22] Filed: Dec. 8, 1995

Related U.S. Application Data

[62] Division of Ser. No. 200,012, Feb. 22, 1994, Pat. No. 5,494,299.

[51] Int. Cl.⁶ .................................................. F16J 15/34
[52] U.S. Cl. ........................... 277/15; 277/59; 277/65; 277/69; 415/111; 415/175
[58] Field of Search .......................... 277/15, 22, 59, 277/63, 65, 68, 69, 42, 43, 88, 96.1; 415/111, 113, 175, 180

[56] References Cited

U.S. PATENT DOCUMENTS

| | | |
|---|---|---|
| 2,005,429 | 6/1935 | Lichtenstein . |
| 2,373,609 | 4/1945 | Stahl . |
| 2,382,960 | 8/1945 | Compton et al. . |
| 2,386,505 | 10/1945 | Puchy . |
| 2,628,852 | 2/1953 | Voytech ...................... 277/22 |
| 2,820,653 | 1/1958 | Yokel ........................... 277/22 |
| 2,903,970 | 9/1959 | Elovitz et al. . |
| 2,984,505 | 5/1961 | Andresen et al. . |
| 3,027,165 | 3/1962 | Kempff et al. . |
| 3,112,708 | 12/1963 | Kaufmann . |
| 3,115,097 | 12/1963 | Zagar et al. . |
| 3,122,375 | 2/1964 | Greenwald . |
| 3,195,035 | 7/1965 | Sudmeier . |
| 3,477,729 | 11/1969 | Hershey ......................... 277/22 |
| 3,515,497 | 6/1970 | Studebaker et al. . |
| 3,591,188 | 7/1971 | Eisner ........................... 277/65 |
| 3,624,763 | 11/1971 | Rohr . |
| 3,655,295 | 4/1972 | Mitchell . |
| 3,905,605 | 9/1975 | Hubner ......................... 277/22 |
| 3,923,416 | 12/1975 | Frey . |
| 4,439,096 | 3/1984 | Rockwood et al. . |
| 4,443,015 | 4/1984 | Duffee et al. .................. 277/65 |
| 4,483,540 | 11/1984 | Bordien et al. ................ 277/65 |
| 4,521,151 | 6/1985 | Frater et al. . |
| 4,613,141 | 9/1986 | Heinen . |
| 4,688,806 | 8/1987 | Heilala . |
| 4,708,711 | 11/1987 | Scherer ......................... 277/65 |
| 4,721,311 | 1/1988 | Kakabaker .................... 277/22 |
| 4,813,689 | 3/1989 | Stalter et al. . |
| 4,900,039 | 2/1990 | Klecker et al. . |

(List continued on next page.)

FOREIGN PATENT DOCUMENTS

| | | |
|---|---|---|
| 0510959 | 10/1992 | European Pat. Off. . |
| 1040304 | 10/1953 | France . |
| 2822499 | 11/1978 | Germany . |
| 616994 | 4/1980 | Switzerland . |
| 941683 | 7/1982 | U.S.S.R. . |

*Primary Examiner*—Scott Cummings
*Attorney, Agent, or Firm*—Myers Liniak & Berenato

[57] ABSTRACT

A seal construction is provided for sealing a rotating pump shaft against passage of a fluid along its central axis. The seal construction includes front and rear sealing flanges mounted coaxially to and rotatable with the pump shaft. Stationary engaging members are provided adjacent the rear surface of the front sealing flange and the front surface of the rear sealing flange for sealing engagement therewith. A temperature stabilized chamber is provided adjacent each sealing flange including means for recirculating and cooling fluid disposed therein so as to maintain the fluid between adjacent engaging members at a substantially constant temperature thereby maintaining a flatness of the sealing engagement between the sealing flange surfaces and the engaging members. The recirculating/cooling system includes a gland having first, second, third, and fourth fluid passages defined therein.

12 Claims, 9 Drawing Sheets

U.S. PATENT DOCUMENTS

| | | |
|---|---|---|
| 4,915,579 | 4/1990 | Whittier et al. . |
| 5,011,166 | 4/1991 | Watts . |
| 5,203,575 | 4/1993 | Azibert et al. .............................. 277/65 |
| 5,217,234 | 6/1993 | Hornsby ...................................... 277/65 |
| 5,238,253 | 8/1993 | Siegartner .................................. 277/65 |
| 5,261,676 | 11/1993 | Rockwood . |
| 5,336,047 | 8/1994 | Kolhouse ................................... 277/65 |

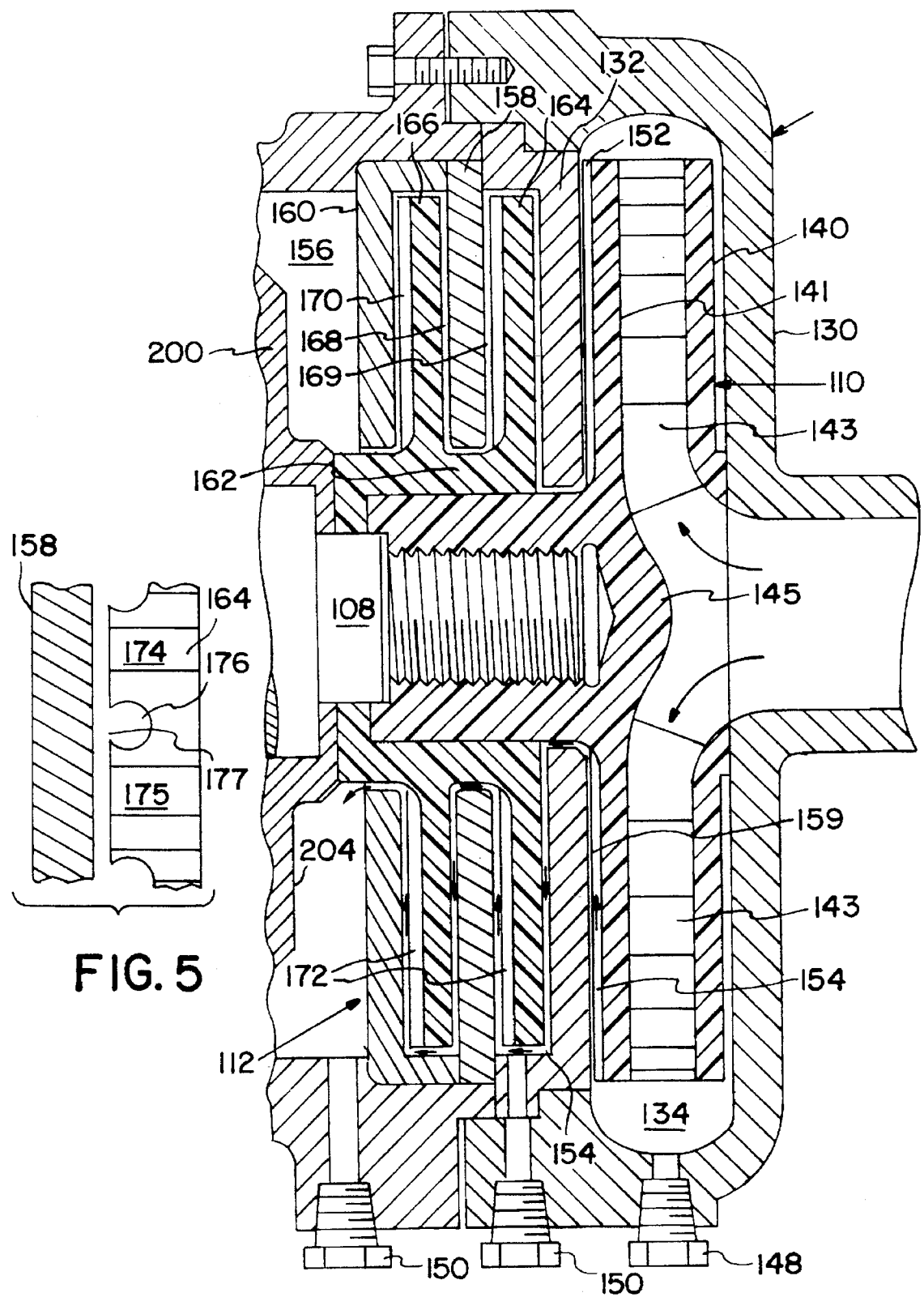

TEMPERATURE AND PRESSURE RESISTANT ROTATING SEAL CONSTRUCTION FOR A PUMP

This is a division of application Ser. No. 08/200,012 filed Feb. 22, 1994 now U.S. Pat. 5,494,299.

This invention relates to a seal construction for a pump. More particularly, this invention relates to a seal construction for sealing a rotating shaft against passage of a fluid along a central axis defined by the shaft.

BACKGROUND OF THE INVENTION

Environmentally hazardous fluids such as acids, oils, and toxins which can cause serious harm to the environment often need to be pumped through fluid flow systems from one location to another. When pumping such dangerous flow materials, it is important that neither the liquid nor the gases which are often released by the liquid escape to the atmosphere or pump areas outside the desired fluid pumping path.

Heretofore, conventional mechanical seals were developed to overcome rotating pump shaft sealing problems. These prior art mechanical seals allow for a fairly secure seal against the pumped fluids so as to prevent them from leaking or escaping along the shaft of the pump. Yet, in some cases the hazardous fluid penetrates these seals when the pressure within the pump becomes too high for the seal to handle, thus allowing the fluid to escape into the surrounding environment and/or the motor area of the pump. The competing interests of maintaining an efficient pump versus operating a safe one requires appropriate balancing of the two interests, because the more fluid flowing through the pump, the higher the pressure therein. Predicting the amount of safety required can only be broadly approximated based on the type of liquid to be pumped. The more hazardous the liquid, the more secure the seal construction need be.

Another problem with the aforesaid conventional mechanical seals is that gases produced by the liquids being pumped and sealed against often escape. Conventional mechanical seals are often permeated by these vapors. One solution to this problem was the creation of an arrangement known as a double seal with barrier fluid protection. In this arrangement, two seals form a cavity which is filled with a clean or environmentally safe fluid. The seal facing the excess hazardous liquid (i.e. the first seal), that which does not exit the pump where desired, inhibits movement of the liquid sufficiently to prevent penetration of the seal by the liquid. The vapor which permeates the first seal is stopped by the barrier fluid disposed in the cavity.

A drawback associated with conventional double seal systems is that any failure by the first seal can defeat the entire double seal arrangement. If the first of the two seals breaks down, the barrier fluid is permitted to escape from the cavity in effect allowing the harmful gases to penetrate the second seal thus reaching the surrounding environment. Furthermore, the harmful liquid, after the break-down of the first seal, often penetrates the second seal thus creating both gaseous and liquid leakage. These leakages typically ruin the motor which drives the pump and pollute the surrounding environment.

The breaking of the aforesaid double seals is a problem of longstanding concern due to the fact that the barrier fluid in the cavity must be maintained at a relatively high barrier pressure in order to be effective. These high pressures within the cavity often result in a break or leak in one of the two seals.

Another solution to the problem of hazardous materials leaking into the environment was the development of pumps in which the motor is disposed entirely within the pump housing. One such type is known as the "canned motor pump." A drawback of such pumps is the maintenance requirements associated with the motor. Unfortunately, the pump housing must be disassembled each time the motor requires maintenance. Furthermore, corrosive fluids being pumped often leak into and adversely affect the motor. As a result, the bearings of the motor as well as other parts thereof often clog which in effect increases the downtime of the system. In addition, the "canned motor pump" is not desireable for use with hot or dirty liquids due to the effect they have on moving parts of the motor when they leak thereinto. Finally, the efficiency of "canned motor pumps" is questionable because the motor's rotating parts often turn within corrosive fluids which have leaked into and flooded the motor area of the pump housing thus resulting in higher than normal friction forces occurring. In order to overcome this problem, sleeve bearings often have to be used instead of ball bearings.

The use of magnetic pumps was also an attempt to solve many of the aforesaid problems by housing the pump entirely within a single body (or housing) and driving the pump by a motor surrounding the body thereby preventing leakage of the fluid being pumped from affecting the performance of the motor. The motor and pump shafts in such pumps are magnetically coupled. One magnet is affixed to the motor and a magnet of opposite polarity is attached to the pump shaft within the body. These magnetic pumps, however, experience the same problems as the canned motor pumps with respect to the pump shaft bearings being exposed to the corrosive fluids being pumped. Furthermore, the efficiency of magnetic pumps can be quite low due to the loss of energy in transferring the driving force magnetically through the pair of housings to the pump shaft.

Each of the aforesaid described prior art pumps requires a high amount of maintenance if the pumped fluid is to be kept from leaking or escaping into the surrounding environment and the pump motor is to be maintained in proper operating condition.

FIG. 1 is a longitudinal partial cross-sectional view of another prior art seal construction for a pump 20 disclosed in commonly owned related U.S. Pat. No. 5,261,676, the disclosure of which is hereby incorporated herein by reference. This seal construction qualifies as prior art to the instant application because it was offered for sale more than one year prior to the instant filing date.

Prior art pump 20 includes an electric motor 1 enclosed in casing 3, the motor having a drive shaft 5 affixed to pump shaft 7 as by a key-lock mechanism. Shaft 7 of the pump is connected at one axial end to motor shaft 5 and at the other axial end to impeller assembly 9 of pump 20.

As shown, pump 20 includes three different barrier sealing devices including repeller assembly 11, triplex seal construction 13, and piston seal arrangement 15. Each of these barrier sealing mechanisms is coaxial with pump shaft 7 and is arranged axially between motor 1 and impeller assembly 9 for the purpose of preventing the fluid to be sealed against from leaking from the pump passageways axially backward toward motor 1. The aforesaid barrier sealing mechanisms function to control or seal the fluid (liquid or gas) being pumped from undesired contact with both motor 1 and the environment in which pump 20 is operating. Repeller assembly 11 and impeller assembly 9 define the wet end of pump 20, while motor 1 defines the dry end of the pump.

While most of the fluid being pumped by impeller 23 will exit the pump via volute out-flow (i.e. discharge) path 21, inevitably some of the fluid will pass axially behind impeller 23 into a narrow passageway extending from volute 25 axially backward toward and communicating with fluid chamber reservoir 35. This passageway is formed by the combination of impeller 23 and repeller assembly 11 including their plurality of inwardly extending, circular coaxial stationary back plates 29, 31, and 33.

When this inevitable portion of the fluid to be sealed against enters the aforesaid passageway, the centrifugal force exerted by the rotation of impeller 23 forces the fluid axially backward through the passageway to chamber 35 where it encounters triplex seal 13.

FIG. 2 is a longitudinal cross-sectional view of the prior art triplex seal construction 13 of pump 20. After the fluid being pumped and to be sealed against enters chamber 35, it encounters triplex seal arrangement 13. The triplex seal includes a circular rotating flange 37 which has a frontal radially extending surface 38 facing the wet end of pump 20, and a rear side 39 defining a rotating sealing surface. Flange 37 is coaxially affixed to pump shaft 7 and rotates therewith along with the impeller and repeller. The rear side or surface 39 of flange 37 includes a plurality of annular sealing members 41, 43, and 45 with sealing surfaces 47–49 defined thereon. Sealing surfaces 47–49 of flange 37 sealingly engage a plurality of stationary annular sealing or engaging members 50–52. Springs 57, 55, and 53 constantly bias stationary sealing members 50–52, respectively, into sealing engagement with rotating sealing surfaces 47–49 of flange 37.

The fluid to be sealed against enters chamber 35 by way of the aforesaid passageway and proceeds over and around the front face 38 of rotating flange 37 to the radially outer edge of rotating sealing surface 39. The fluid to be sealed against then proceeds into and through neck area 59 where the fluid applies a radially inward directed pressure on flexible annular diaphragm 61. Radially inward flexing of diaphragm 61 is limited by shelf 63, while radially outward flexing of the diaphragm is limited by a similar shelf 65 affixed to mounting flange 67. Mounting flange 67 is stationary and fixed against rotational movement as by being mounted to circular housing 69.

During operation of the pump, flexible rubber diaphragm 61 has numerous possible positions. The radially inward pressure exerted by the fluid to be sealed against on the diaphragm determines the amount of axial force placed on sealing surfaces 47–49 of flange 37 by the front engaging surfaces of stationary sealing members 50–52. Diaphragm 61 is attached across neck 59 (or fluid passageway) in such a way that any increase in pressure by the fluid to be sealed against upon the radially outer surface of diaphragm 61 will cause the diaphragm to flex radially inward thereby increasing the surface area of stationary member 71 exposed to the forward directed axial force of the diaphragm. The net effect of the radially inward flexing of diaphragm 61 is to further urge the sealing surface of stationary sealing member 50 into sealing engagement with sealing surface 47 of flange sealing member 41. In other words, the more fluid present in chamber 35, the tighter the sealing engagement between engaging members 50 and 41. Diaphragms 85 and 87 function in similar fashions.

Chambers 77 and 79 are formed between stationary annular sealing members 50–52 and may be filled with environmentally safe gas or liquid (i.e. fluid) as desired through injection orifices 81 and 83. Orifices 81 and 83 communicate with chambers 77 and 79, respectively, so as to selectively provide thereinto an environmentally safe barrier fluid at a pressure which may be used to control the amount and direction of flexing of diaphragms 61, 85, and 87. Often, only one of chambers 77 or 79 will be filled with such a barrier fluid other than that being pumped. The barrier fluid, in chamber 77 for example, applies pressure to the adjacent diaphragms (i.e. 61 and 85) in order to counteract or at least partially offset the effect of the pressure exerted by the fluid to be sealed against present in chamber 35. In such a manner, the sealing force between sealing members 41 and 50 may also be controlled by the pressure of the barrier fluid disposed within chamber 77.

Additionally, if the fluid to be sealed against somehow leaks through the sealing interface between rotating seal surface 47 and stationary member 50, and into chamber 77, chamber 79 may be filled with a barrier fluid so as to offset the pressure of the fluid to be sealed against upon the radially outer surface of diaphragm 85.

While the aforesaid triplex seal construction provides excellent results, it is felt that the three annular sealing interfaces could be improved regarding their sensitivity to temperature and pressure. Seal faces 47 and 50 are held to flatness tolerances of about two helium light bands (0.000023 inches) or less. Therefore, as in virtually all mechanical seals, small changes in temperature or pressure can minimize the effectiveness of the flatness of the sealing interface between rotating sealing surfaces 47–49 and stationary sealing members 50–52 of triplex seal 13. For example, changes in temperature may cause the sealing surfaces to expand or contract thereby eventually creating a small gap through which the fluid to be sealed against can leak.

Another area for improvement of the aforesaid triplex seal 13 is its resistance to vibration. The effects of pump shaft 7 vibration on the seal are highest with respect to the most radially outward seal made up of stationary member 50 and rotating sealing surface 47. The fact that this sealing interface is positioned furthest radially outward from pump shaft 7 makes it the most sensitive to vibration induced by the shaft. The most radially inward seal made up of stationary member 52 and rotating surface 49 is of course less sensitive to pump shaft vibration due to its radial position. As a result, any internal or external vibration will have the most effect on the outermost seal.

It is apparent from the above that there exists a need in the art for a seal construction for a pump which is even less sensitive to surrounding changes in temperature, pressure, and vibration.

It is a purpose of this invention to fulfill the above-described needs, as well as other needs apparent to the skilled artisan from the following detailed description of this invention.

SUMMARY OF THE INVENTION

Generally speaking, this invention fulfills the above-described needs in the art by providing a seal construction for sealing a rotating shaft against passage of a fluid along a central axis of the rotating shaft, the seal construction comprising:

first and second sealing flanges each fixedly mounted on the shaft and rotatable therewith about the central axis, the first and second sealing flanges each having a forward and rear surface, each of the surfaces extending in a generally radial direction with respect to the central axis, the forward surface of the first rotatable sealing flange to be exposed to the fluid to be sealed against;

a first stationary sealing means for creating a fluid seal between the rear surface of the first rotatable sealing flange and the first stationary sealing means, the first stationary sealing means comprising: a first engaging member having a forward surface located for sealing engagement with the rear surface of the first sealing flange, the first engaging member being spaced radially outwardly from and extending circumferentially around the rotating shaft; and a first biasing means for normally urging the forward surface of the first engaging member into sealing engagement with the rear surface of the first sealing flange;

a second stationary sealing means for creating a fluid seal between the front surface of the second rotatable sealing flange and the second stationary sealing means, the second stationary sealing means comprising: a second engaging member having a rearward surface located for sealing engagement with the front surface of the second sealing flange, the second engaging member being spaced radially outwardly from and extending circumferentially around the rotating shaft; and a second biasing means for normally urging the rearward surface of the second engaging member into sealing engagement with the front surface of the second sealing flange; and a first annular fluid passageway extending between and interfacing the first and second stationary sealing means, the first fluid passageway being substantially parallel to the central axis and being located radially inward from the first and second stationary sealing means, whereby the first fluid passageway is disposed between the central axis and the first and second stationary sealing means.

In certain preferred embodiments of this invention, the seal construction further comprises a second fluid passageway communicating the fluid to be sealed against with the radially outward side of a first flexible diaphragm, the first diaphragm determining the amount of force placed on a rearward surface of the first engaging member by the fluid to be sealed against, wherein the first diaphragm is disposed such that an increase in pressure of the fluid to be sealed against upon the first diaphragm will cause the first diaphragm to flex radially inward, thereby increasing the surface area of the rearward surface of the first engaging member exposed to the pressure of the fluid to be sealed against, whereby the net effect of the radially inward flexing of the first diaphragm is to further urge the forward surface of the first engaging member into sealing engagement with the rear surface of the first sealing flange; and wherein the second stationary sealing means includes a second diaphragm for determining the amount of force placed on a front surface of the second engaging member by a fluid adjacent the second diaphragm.

In certain further preferred embodiments of this invention, the first stationary sealing means further comprises another engaging member having a forward surface located for sealing engagement with the rear surface of the first sealing flange, the another engaging member being spaced radially outwardly from and extending circumferentially around the rotating shaft, the another engaging member being disposed radially between the first engaging member and the rotating shaft; and another diaphragm for determining the amount of force placed on a rearward surface of the another engaging member.

In certain other preferred embodiments of this invention, the seal construction further comprises a plurality of vanes disposed on the rear surface of the first sealing flange, wherein the vanes are disposed radially inward of the first engaging member and when rotated along with the first sealing flange, impart a circumferential flowing motion to a fluid adjacent the vanes, the vanes causing the fluid to enter a stationary exit orifice and flow through a recirculating system wherein the fluid is cooled (or heated in certain circumstances) and thereafter the fluid flows out of a stationary entrance orifice also adjacent the vanes thereby stabilizing the temperature of the fluid and the sealing interface between the first engaging member and the first sealing flange.

This invention further fulfills the above-described needs in the art by providing a temperature stabilized seal construction for sealing a rotating shaft against passage of a fluid along a central axis of the rotating shaft, the seal construction comprising:

a sealing flange affixed to the rotating shaft and rotatable therewith about the central axis, the sealing flange having a sealing and non-sealing surface, each of the surfaces extending in a generally radial direction with respect to the central axis;

an annular stationary seal for creating a fluid seal between the sealing surface of the sealing flange and the stationary seal, the stationary seal including an engagement surface for sealing engagement with the sealing surface of the sealing flange, the stationary seal being spaced radially outwardly from and extending circumferentially around the rotating shaft;

the fluid to be sealed against being disposed on one radial side of the annular stationary seal and a temperature stabilizing fluid being disposed in an annular chamber on the other radial side of the stationary seal;

circulating means for circulating the temperature stabilizing fluid to and from the chamber, the circulating means forcing the temperature stabilizing fluid out of the chamber to a remote cooling area and subsequently back into the chamber, whereby the circulation of the temperature stabilizing fluid reduces the effects of thermal expansion upon the sealing engagement between the sealing surfaces of the sealing flange and the annular stationary seal.

In certain preferred embodiments of this invention, the circulating means includes a plurality of vanes disposed on the sealing surface of the sealing flange, the vanes being disposed within the chamber, wherein the plurality of vanes impart a flowing action to the temperature stabilizing fluid whereby the fluid flows in a circumferential direction in the chamber thereby flowing circumferentially around the rotating shaft.

In still other preferred embodiments of this invention, the vanes are radially spaced from the rotating shaft and the circulating means further comprises: a chamber exit orifice through which the temperature stabilizing fluid exits the chamber, and a chamber entrance orifice through which the fluid reenters the chamber after flowing through the circulating means, wherein the fluid is cooled after it exits the chamber via the chamber exit orifice, thereby providing the chamber with a continual influx of cooled fluid and a continual out-flow of a corresponding amount of fluid therefrom so as to maintain the sealing engagement between the rotating sealing flange and the stationary seal at a substantially constant temperature.

In certain further preferred embodiments of this invention, the chamber exit orifice faces the circumferential flow direction of the fluid in the chamber so that the fluid is forced thereinto by the vanes, and the chamber entrance orifice faces the direction opposite the circumferential flow direction of the temperature stabilizing fluid so that the cooled fluid is drawn therefrom by the vacuum created by rotation of the flange and the vanes thereon.

This invention further fulfills the above-described needs in the art by providing a seal construction for sealing a rotating shaft against passage of fluid to be sealed against along a central axis of the rotating shaft, the seal construction comprising:

- a sealing flange fixedly mounted on the shaft and rotatable therewith about the central axis, the sealing flange having a forward and rear surface, each of the surfaces extending in a generally radial direction with respect to the central axis, the forward surface of the flange being exposed to the fluid to be sealed against;
- a stationary sealing means for creating a fluid seal between the rear surface of the rotatable sealing flange and the stationary sealing means, the stationary sealing means comprising: an annular engaging member having a nose portion including a forward surface for sealing engagement with the rear surface of the sealing flange, and a block or base portion axially to the rear of the nose portion for stabilizing the nose portion against axial and radial pressure, wherein the nose and block portions are annular and extend circumferentially around the rotating shaft; and biasing means for normally urging the forward surface of the nose portion into sealing engagement with the rear surface of the sealing flange;
- an annular chamber located radially inward of the engaging member whereby the engaging member is disposed radially between the chamber and the fluid to be sealed against and wherein the chamber extends circumferentially around the shaft; and
- an outer fluid passageway adjacent the block portion for allowing the fluid to be sealed against to bear against a radially outward extending axially front surface of the block portion only to a predetermined radially inward extent defined by the nose portion, the outer fluid passageway also allowing the fluid to be sealed against to bear against a radially outward extending axially rear surface of the block portion only to approximately the predetermined radially inward extent, the net effect of the outer fluid passageway being to substantially equalize and offset the axially directed pressure exerted on the block portion radially outward of the predetermined radially inward extent by the fluid to be sealed against in the forward and rearward axial directions.

In certain further preferred embodiments of this invention, the seal construction further comprises an inner fluid passageway adjacent the block portion within the chamber for allowing a fluid in the chamber to bear against the front surface of the block portion only to a predetermined radially outward extent defined by the nose portion, and for allowing the fluid in the chamber to bear against the rear surface of the block portion only to approximately the radially outward predetermined extent, the net effect of the inner and outer fluid passageways being to substantially equalize and offset the pressure exerted by the fluid to be sealed against and the fluid in the chamber on the engaging member in both the forward and rearward axial directions.

In still other further preferred embodiments of this invention, the seal construction further comprises a cavity disposed immediately adjacent the rear surface of the block portion, the cavity extending circumferentially around the shaft and being substantially disposed radially between the predetermined radially inward extent and the predetermined radially outward extent, the cavity including a rubber biasing member disposed therein for offsetting a rearwardly directed axial force urged on the nose portion by the rear surface of the rotating flange, the rubber biasing member exerting a force on the rear surface of the block portion and preventing the fluids from the outer and inner passageways from intermixing with one another.

This invention will now be described with reference to certain embodiments thereof as illustrated in the following drawings.

IN THE DRAWINGS

FIG. 5 is an enlarged fragmentary end view showing an end of the repeller of the pump of FIG. 3.

FIG. 6 is an enlarged fragmentary longitudinal cross-sectional view of the impeller and repeller portions of the pump of FIG. 3.

DETAILED DESCRIPTION OF CERTAIN EMBODIMENTS OF THIS INVENTION

Referring now more particularly to the accompanying drawings in which like numerals indicate like parts throughout the several views.

Figure 1:
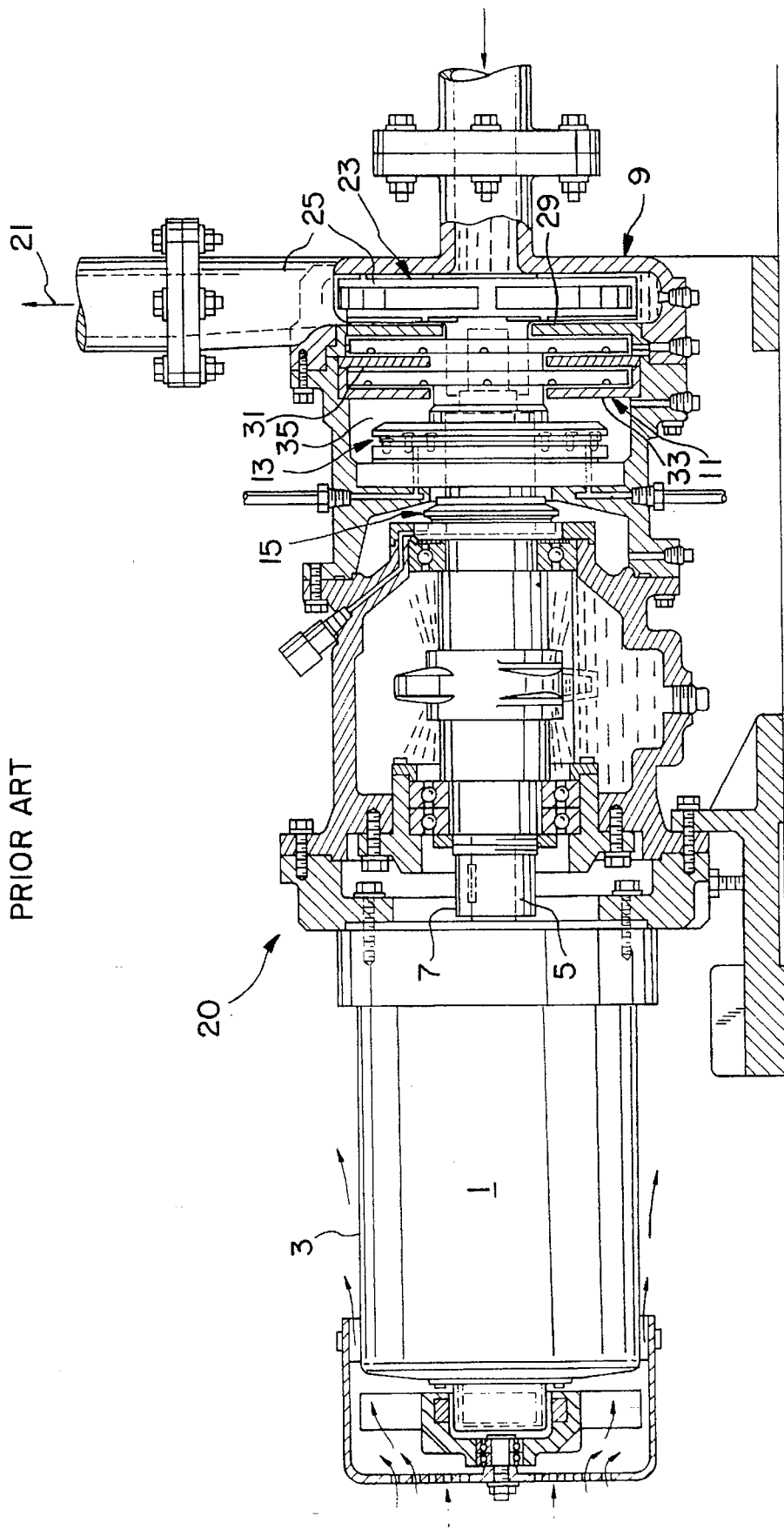
FIG. 1 is a longitudinal partial cross-sectional view of a prior art pump including a triplex seal construction included therein.
Figure 2:
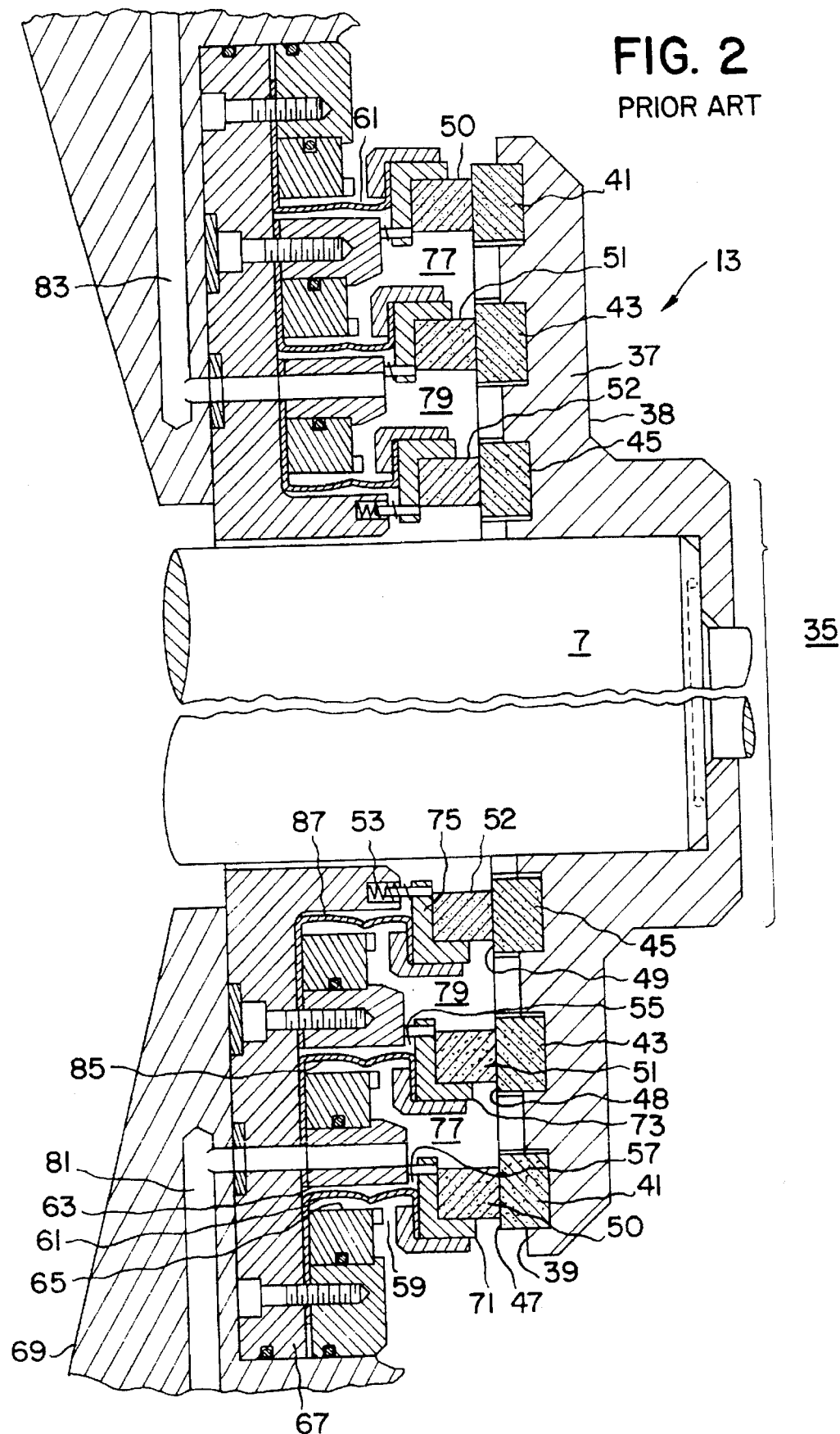
FIG. 2 is an enlarged fragmentary longitudinal cross-sectional view of the prior art triplex seal construction provided in the pump of FIG. 1.
Figure 3:
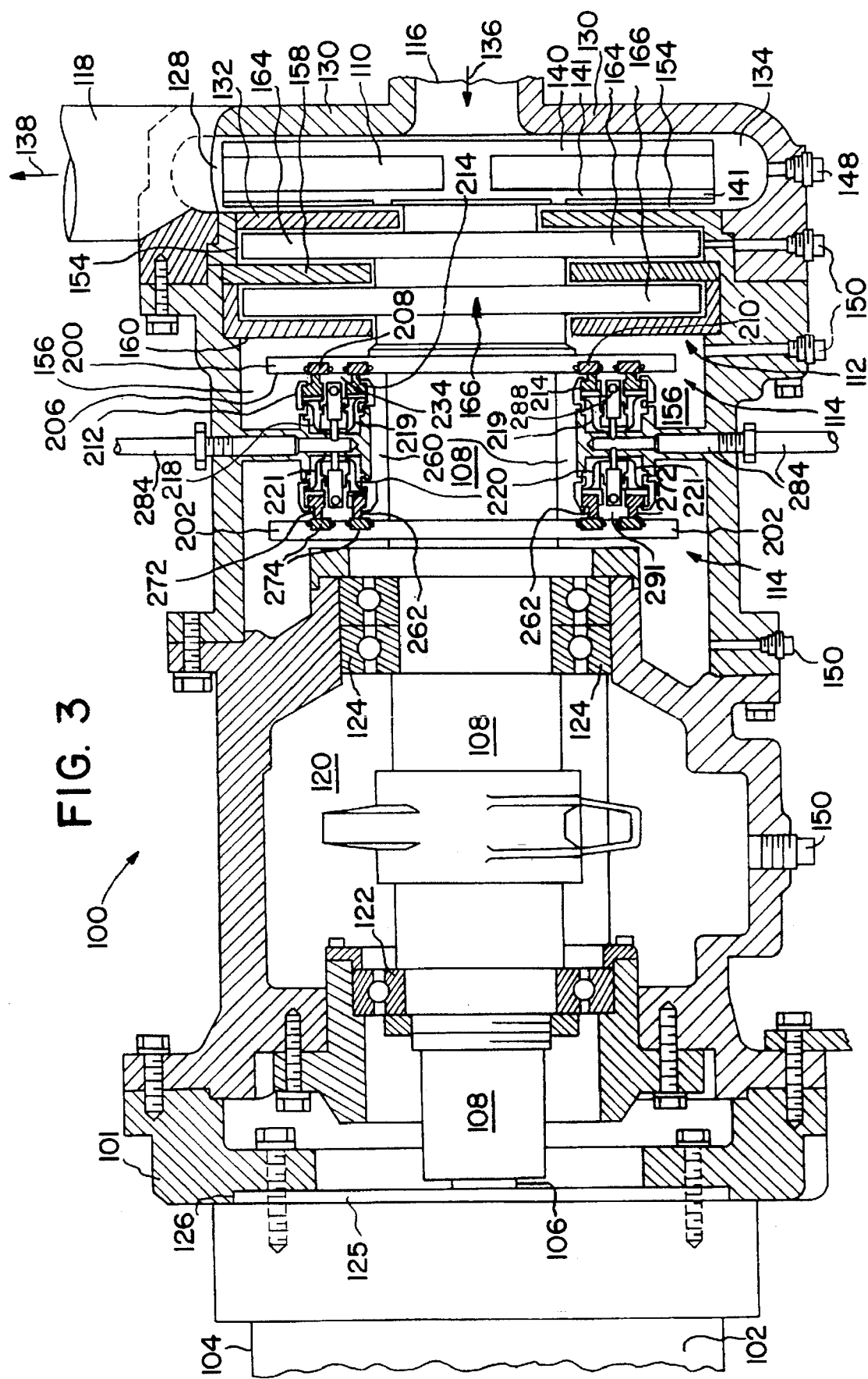
FIG. 3 is a longitudinal partial cross-sectional view of a pump including a quad-seal construction according to an embodiment of this invention.
Figure 4:
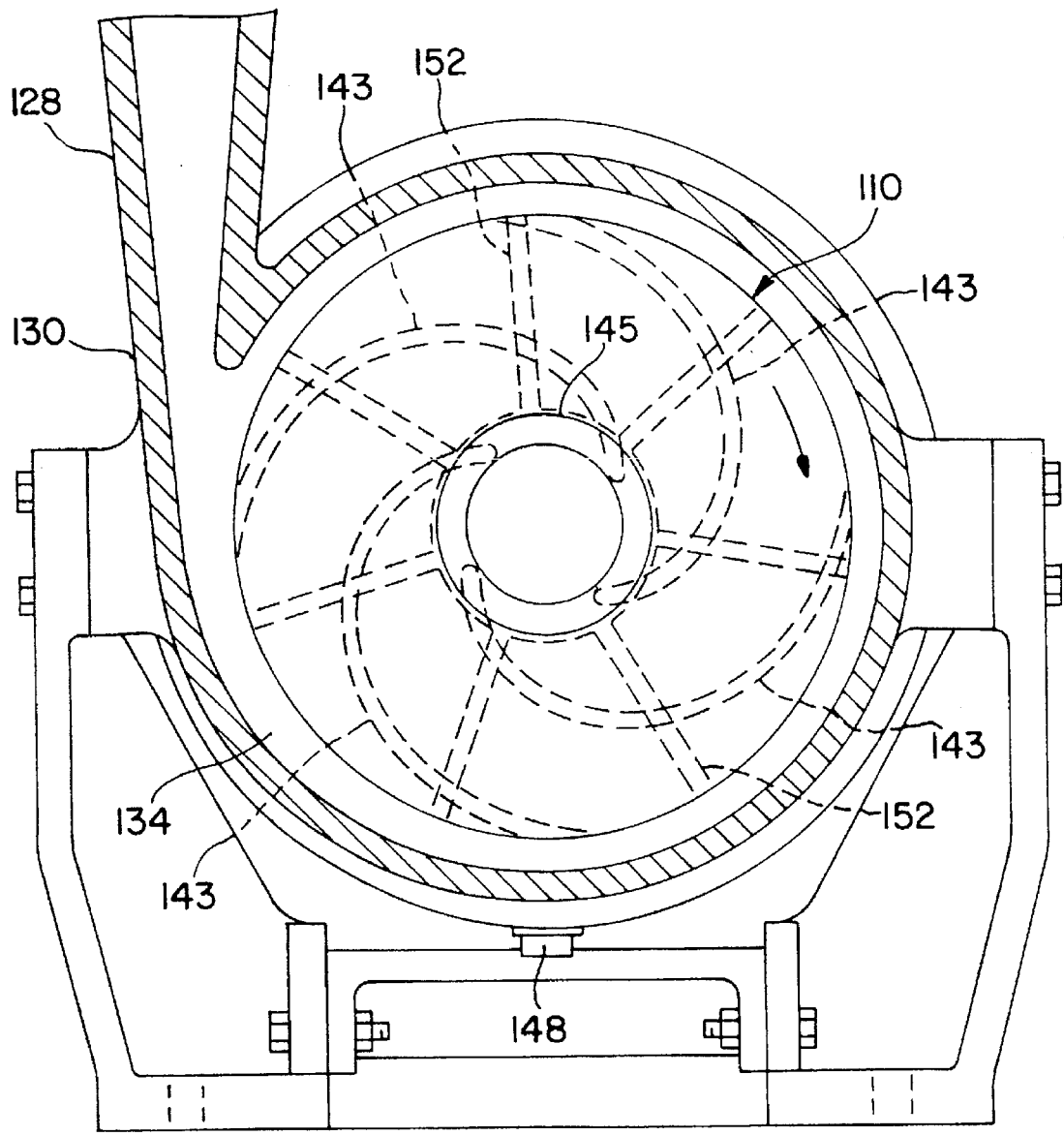
FIG. 4 is a cross-sectional view of the impeller and volute areas of the pump of FIG. 3.

FIG. 3 is a longitudinal cross-sectional view of a pump including a rotating quad-seal construction according to an embodiment of this invention. Pump 100 is preferably used for pumping of hazardous fluids such as acids, oils, and the like, but of course may also be used for pumping non-hazardous fluids.

Pump 100 includes an electric motor 102 (preferably hermetically sealed) enclosed within a metallic casing 104. Motor 102 includes a drive shaft 106 which is coupled at one longitudinal end to pump shaft 108, pump shaft 108 being affixed at one longitudinal end to impeller 110 and at the other longitudinal end to motor drive shaft 106. An inert gas (e.g. Nitrogen) may be introduced into the motor housing 104 so as to hermetically seal the motor within the housing.

As shown, pump 100 includes at least two different barrier sealing devices including repeller assembly 112 and quad-seal construction 114. A piston seal type barrier seal (not shown) may also be provided axially rearward of quad-seal 114 but is preferably left out of this embodiment. Each of repeller assembly 112 and quad-seal 114 is coaxial affixed to pump shaft 108, and is arranged axially between motor 102 and impeller assembly 110. Both quad-seal 114 and repeller assembly 112 function to prevent the fluid being pumped and to be sealed against from leaking from pump passageways 116 and 118 axially rearward toward motor 102. These barrier sealing devices function to preclude the fluid to be sealed against from attaining undesired contact with both motor 102 and the environment in which the pump 100 is operating. It is noted at this time that impeller assembly 110 and repeller assembly 112 define the forward or wet end of pump 100, while motor 102 defines the rearward/dry end of pump 100.

An oil mister assembly 120 is disposed axially between quad-seal 114 and motor 102 in order to provide lubrication to rotary bearings 122 and 124 which support pump shaft 108. Bearing assembly 122 is a single row bearing while bearing assembly 124 is a double row bearing. Double row bearings 124, which are stronger than single row bearings 122, are typically, in the prior art, disposed at a position closely adjacent the motor so as to counteract motor/pump shaft misalignment problems. However, according to this embodiment, double row bearings 124 are positioned considerably axially forward of motor 102 because the problem of motor misalignment has been overcome by mounting the forward axial end 125 of motor 102 in a cut-away or recess area 126 defined in pump casing 101. The provision of double row bearing assembly 124 at a position closely adjacent quad-seal 114 reduces the amount of pump shaft vibration occurring in the quad-seal area of the pump shaft. This provides for added stabilization of quad-seal 114 with respect to pump shaft vibration without increasing the overall length of the pump.

Impeller assembly 110 of pump 100 is best illustrated in FIGS. 3–6. A volute 128 is formed by metal casing portion 130 and radially extending back plate 132. Volute 128 defines a chamber 134 having an axial opening 116 forming in-flow path 136, and a radially extending opening forming out-flow path 138. As the fluid to be pumped and sealed against flows into volute 128 by way of in-flow opening 116, disk shaped rotating impeller 110 forces a substantial portion of the fluid radially outward through out-flow path 138.

Impeller 110, which is, as shown, of the conventional closed type, is coaxially affixed to pump shaft 108 and includes a pair of circular facing plates 140 and 141, with a plurality of curved veins 143 (see FIG. 4) interconnecting plates 140 and 141. Alternatively, a conventional open type impeller can be used. Veins 143 extend in a substantially parabolic pattern from the impeller center 145 radially outward. The domed center 145 (see FIG. 6) of impeller 110 reduces the turbulence created by the high pressure of the pumped fluid as it enters volute 128 by way of in-flow path 136. Rear plate 141 of the impeller is integrally formed with domed center 145 and is threadedly attached to pump shaft 108, thereby allowing for the impeller to rotate coaxially with the pump shaft.

A screw-type drain plug 148 is provided in the bottom portion of pump casing 130 for allowing an operator to selectively drain the interior 134 of volute 128. A plurality of additional drain plugs 150 are provided for draining various other areas of pump 100.

If desired, conventional back pump veins 152 (see FIG. 4) may be provided in impeller 110 so as to prevent fluid flow toward the repeller during impeller rotation.

While most of the fluid being pumped will exit the volute via out-path 138, some fluid may pass axially behind impeller 110 into a narrow passageway 154 (see FIGS. 3 and 6). The direction of fluid flow through passageway 154 is illustrated in FIG. 6 by a plurality of flow arrows. The force created by rotation of impeller 110 forces the fluid to be pumped and sealed against through the maze of passageway 154 until it reaches fluid chamber 156 adjacent quad-seal 114. Passageway 154 is formed by the combination of impeller 110 and repeller assembly 112 along with a plurality of inwardly radially extending backplates 132, 158, and 160.

After the fluid to be pumped and sealed against enters passageway 154, it travels radially inward through the first section 159 of the passageway disposed between the rear surface of impeller back plate 141 and stationary plate 132. Thereafter, under sufficient pressure, the fluid to be sealed against moves axially rearward within the first horizontal section of passageway 154 toward repeller mounting member 162, the first horizontal portion of the passageway being formed between the impeller hub or collar 145 and back plate 132.

Back plate 132 also forms one of the walls of both the first vertical portion 160 of passageway 154 and the second vertical portion of the passageway. The second vertical portion is formed between back plate 132 and the most axially frontward radially extending flange 164 acting as a repeller of repeller assembly 112. Flange 164 is fixed to motor shaft 108 for rotation therewith and extends radially in a substantially perpendicular manner from the axis of shaft 108. A substantially parallel and identical second repeller flange 166 is integrally formed with first flange 164 and repeller mounting member 162 which encases a substantial portion of impeller collar 145. Like collar 145, repeller mounting member 162 is fixedly mounted to pump shaft 108 and rotates therewith.

Repeller mounting member 162 along with its integrally formed flanges 164 and 166 act in conjunction with inwardly extending back plates 132, 158, and 160 to form repeller assembly 112 as well as the horizontal and vertical portions of passageway 154 through which the fluid to be sealed against travels. The third, fourth, and fifth vertical or radially extending portions 169, 168, and 170, respectively, of passageway 154 are formed between the radially extending planar surfaces of members 164, 158, 166, and 160.

The zig-zag shape of passageway 154 as it winds through the repeller section is a difficult barrier for the fluid to be sealed against to overcome in order to reach chamber 156 and ultimately motor 102. The upwardly, downwardly, and horizontally extending passageway 154 elongates the distance which the fluid to be sealed against must travel in order to cause damage to the motor or the environment in which the pump is operating. Because the fluid being pumped will follow the path of least resistance, it will tend to remain in and exit volute 128 rather than traverse the zig-zag portions of passageway 154. However, as discussed above, a small amount of the fluid being pumped will inevitably leak into and travel through passageway 154, resulting in annular chamber 156 adjacent quad-seal 114 being filled.

In addition to the shape of impeller/repeller passageway 154, other structures therein act to prevent the fluid being pumped from reaching chamber 156. Each repeller flange 164 and 166 has a radially extending vein arrangement 172 defined therein. As shown in FIG. 5, in each of the vein arrangements 172, adjacent veins such as 174 and 175 are shaped so as to define an open-ended cylindrical channel 176 with substantially enclosed circular cross-sections forming approximately 270° arcs, each channel open at a mouth 177 defining an interface with the repeller flange surface.

By rotating repeller assembly 112 including flanges 164 and 166 along with pump shaft 108, most of the fluid attempting to travel through passageway 154 toward motor 102 is forced into channels 176 which results in the fluid reversing direction and traveling back toward impeller 110. It is important that channels 176 not be completely enclosed. The combination of the liquid being pushed by repeller assembly 112 against back plates 132, 158, and 160 imposes on the liquid an upward spiral motion which expels the liquid back through channels 176 toward the impeller. Back plates 132, 158, and 160 are of course stationary and become a source of friction which is necessary for the liquid to assume the aforesaid spiraling motion.

Drainage ports and plugs 150 of this embodiment permit operators to selectively empty when needed the impeller and repeller chambers which collect liquid or gas being pumped which escapes volute chamber 134 and travels through passageway 154 past the impeller. Fluid (liquid or gas) entering annular quad-seal cavity 156 may do so in a number of ways. The fluid may traverse the entire passageway 154 without entering a cylindrical channel 176; there could be a failure in repeller assembly 112; the pressure of the fluid entering repeller assembly 112 could be so great so as to overcome the vortex energy generated by the repeller; etc. The bottom line is that eventually, the fluid being pumped often traverses passageway 154 and fills quad-seal chamber 156.

Figure 7:
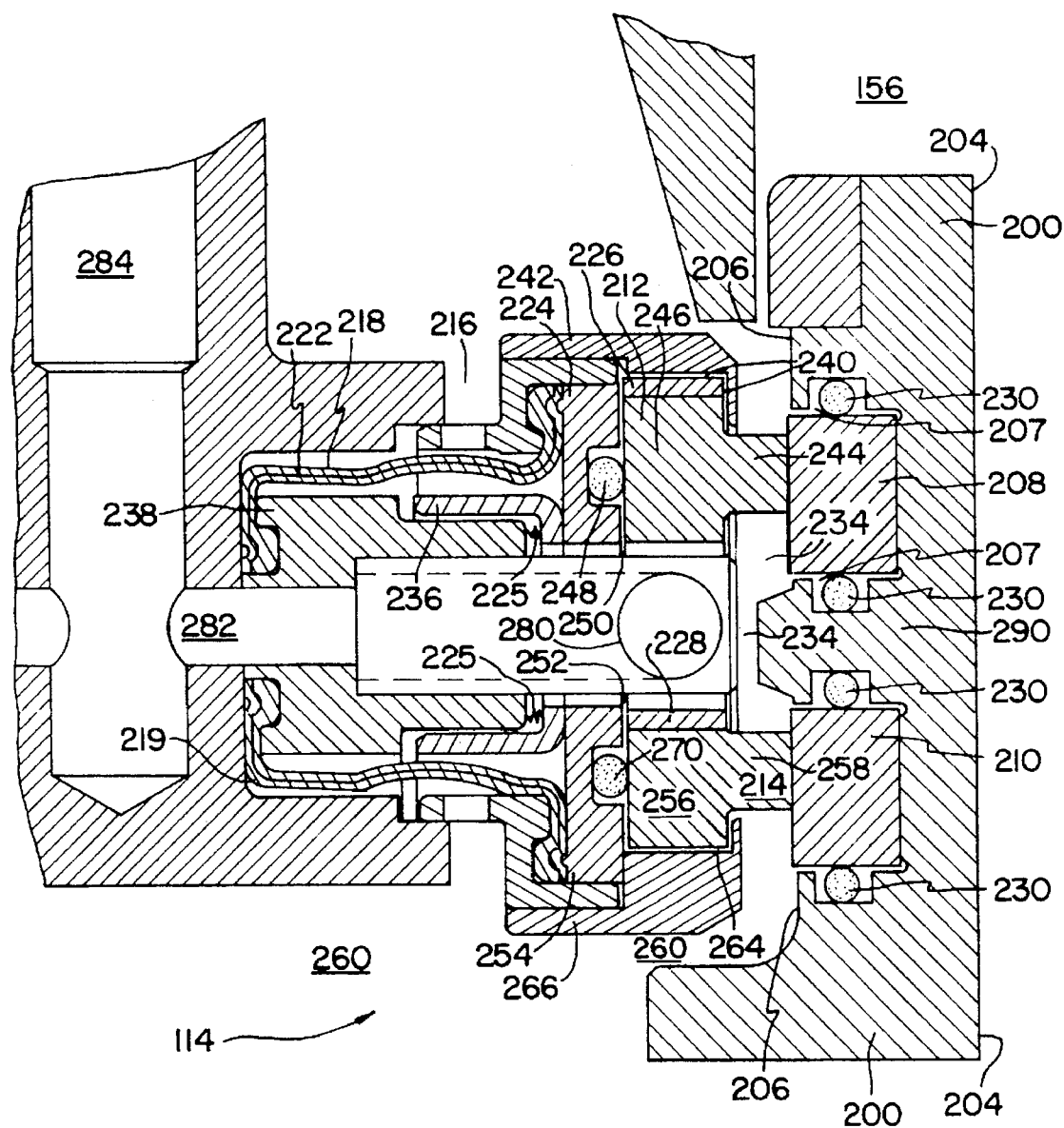
FIG. 7 is an enlarged longitudinal cross-sectional view of the top half of one of the rotating sealing flanges and corresponding stationary sealing members of the quad-seal construction of FIG. 3.

After entering annular chamber 156, the sole barrier between the fluid to be sealed against and oil misting area 120 and motor 102 is quad-seal construction 114. Quad-seal 114 is shown in full by FIG. 3, while FIG. 7 illustrates an enlarged partial cross-sectional view of the top half of the axially frontward portion thereof. The axially rearward half of quad-seal 114 is merely an inversion of the half shown in FIG. 7.

Quad-seal 114 includes first and second rotating sealing flanges 200 and 202, respectively. Sealing flanges 200 and 202 are coaxially affixed to pump shaft 108 and are rotatable therewith about the central axis of the pump shaft. Each sealing flange 200 and 202 includes a front and rear radially extending surface. The front surface 204 (see FIG. 7) of sealing flange 200 faces the impeller and repeller assemblies (i.e. the wet end of pump 100) and is the first surface of flange 200 to come into contact with the fluid to be sealed against. The rear radially extending surface 206 of sealing flange 200 faces the dry end of pump 100., i.e. toward motor 102. Rear surface 206 of sealing flange 200 includes a pair of annular sealing members 208 and 210 fixedly disposed therein. Flange sealing members 208 and 210 extend circumferentially around pump shaft 108 at substantially constant radii, with the inner diameter of outer flange sealing member 208 being substantially greater than the outer diameter of inner flange sealing member 210.

Because flange sealing members 208 and 210 are annular in design and circumferentially surround shaft 108, they are shown, in FIG. 3, attached to sealing flange 200 both above and below pump shaft 108.

A stationary sealing arrangement, including outer and inner stationary engaging members 212 and 214, respectively, is disposed axially rearward of sealing flange 200. Radially outer engaging member 212 is disposed immediately adjacent flange sealing member 208 so as to provide a fluid sealing contact/interface between the axially rearward surface of flange seal 208 and the forward surface of engaging member 212. Likewise, radially inner stationary engaging member 214 is disposed axially rearward of flange seal 210 so as to provide a similar fluid sealing contact therebetween. Stationary engaging members 212 and 214 are annular in design and circumferentially surround pump shaft 108, engaging members 212 and 214 being disposed at radial distances therefrom corresponding to flange sealing members 208 and 210. Springs 225 are disposed axially rearward of engaging members 212 and 214 and act as biasing means for continually urging their adjacent engaging members 212 and 214 into sealing engagement with flange seals 208 and 210, respectively. Springs 225 are disposed between, for example, L-shaped member 236 and annular member 238. Similar springs are provided adjacent the front surfaces of engaging members 262 and 272, but are not shown in FIG. 3 for purposes of simplicity.

As sealing flange 200 rotates along with pump shaft 108 a fluid seal is created between the engaging surfaces of rotating seals 208, 210 and stationary engaging members 212, 214, respectively.

Each annular engaging member 212, 214, 262, and 272 includes a nose portion and a block portion, the nose portion protruding from the block portion and forming the sealing engagement with the adjacent flange seal. Engaging member 212 for example, includes nose portion 244 extending outward from block portion 246. Likewise, engaging member 214 includes nose portion 258 and block portion 256.

As the fluid to be sealed against flows into chamber 156 via passageway 154, it first comes into contact with the front surface 204 of sealing flange 200. The fluid then flows radially outward along the front surface of flange 200 until it reaches the outer periphery thereof, the fluid then proceeding axially rearward and radially inward along the rear surface 206 of the sealing flange. The fluid to be sealed against finally comes into contact with the rotating seal maintained between the nose portion 244 of engaging member 212 and flange seal 208. As the radially inward flow of the fluid is halted by this seal, the fluid proceeds axially rearward along stationary annular support 242 until it reaches neck passageway 216 through which it flows, the fluid finally coming into contact with the radially outer surface of annular diaphragm 218.

Diaphragm 218, along with the other three annular quad-seal diaphragms 219–221, is made of a flexible rubber material having a stiffening member 222 disposed therein and extends circumferentially around pump shaft 108. As the fluid to be sealed against contacts the radially outward side of diaphragm 218, the amount of force exerted thereon determines the amount of force to be placed by diaphragm 218 on the rear surface of annular support member 224. The more force placed on the support 224 by diaphragm 218, the tighter the sealing engagement between members 208 and 212. As the fluid pressure in chamber 156 increases thereby forcing diaphragm 218 to flex radially inward, diaphragm 218 exerts additional pressure on the rear surface of support member 224 which in turn further urges the sealing engaging surface of engaging member 212 into sealing contact with the rear surface of flange seal 208. In other words, the net effect of the radially inward flexing of diaphragm 218 is to further bias the forward surface (i.e. nose portion) of engaging member 212 into sealing engagement with the rear surface of annular flange seal 208. Diaphragms 219–221 function in the same manner.

Stationary annular engaging members 212 and 214 are stabilized against radial movement by annular supporting/stiffening bands 226 and 228. As is the case with engaging members 212 and 214, annular support bands 226 and 228 circumferentially surround pump shaft 108, support bands 226 and 228 being disposed radially outward of their adjacent stationary engaging members 212 and 214, respectively. Support bands 226 and 228 are preferably made of a metal material. They are heated to extreme temperatures and thereafter wrapped around the radially outer periphery of engagement members 212 and 214, respectively. When allowed to cool, supporting bands 226 and 228 contract thereby providing a tight sealing fit between themselves and stationary engaging members 212 and 214, respectively. The presence of bands 226 and 228 stabilizes engaging members 212 and 214 against radially outward movement, thereby creating a more stabilized sealing engagement between the engaging members and their respective flange seals 208 and 210. L-shaped member 236 abuts spring 225.

Flange seals 208 and 210 are preferably held in position and stabilized against radial movement by annular rubber members 230 mounted within flange 200. Rubber members 230 are positioned on both radial sides of each flange sealing member 208 and 210.

The sealing engagement between the front surfaces of engaging members 212 and 214 and the rear surfaces of flange seals 208 and 210 is highly sensitive to pressure variations affecting both the engaging members and the flange seals. For example, a sufficient pressure directed upon certain areas of an engaging member can often create a moment about which the member is forced to rotate thereby disrupting the sealing engagement between the member and its corresponding flange seal. Accordingly, the quad-seal 114 of this embodiment is provided with a pressure stabilizing design which is described below.

A fluid sealed annular chamber 234 is disposed radially between stationary engaging members 212 and 214. Chamber 234 extends from the radially inner surface of diaphragm 218 to the radially outer surface of diaphragm 219, and from the radially inner periphery of engaging member 212 to the radially outer periphery of engaging member 214. Chamber 234 may selectively be pumped full of a clean or environmentally safe barrier fluid so as to allow the radial pressure exerted on diaphragm 218 and stationary engagement member 212 by the fluid to be sealed against in chamber 156 to be at least partially offset or equalized by the pressure of the barrier fluid in chamber 234. The barrier fluid in chamber 234 is preferably maintained at a pressure which substantially offsets to some extent the radially inward flexing of diaphragm 218 created by the pressure of the fluid to be sealed against in chamber 156, the barrier fluid contacting the inner peripheral surface of diaphragm 218 by way of a passageway defined between L-shaped member 236 and diaphragm support member 238.

The barrier fluid in chamber 234 also acts to substantially offset or equalize both the radial and axial pressures exerted on engagement member 212 by the fluid to be sealed against present in chamber 156. The hazardous fluid in chamber 156 inevitably makes its way into and through passageway 240 defined between the combination of engagement member 212 and annular support band 226, and annular support 242. The fluid flows radially outward from nose portion 244 of engaging member 212 through passageway 240 until it reaches the axially extending portion of annular member 242. Then, the fluid flows axially rearward through between ay 240 defined between annular member 242 and support band 226. Upon coming into contact with the radially extending front surface of spring support member 224, the fluid to be sealed against proceeds radially inward through a passageway defined between the rear surface of block portion 246 of engaging member 212 and the front surface of support member 224. The fluid to be sealed against proceeds radially inward through this passageway until it reaches and is stopped by oval-shaped rubber member 248.

As a result, the fluid to be sealed against surrounds the radially outward surfaces of both the nose 244 and block 246 portions of engaging member 212, necessarily directing a radially inward pressure thereon. Furthermore, the fluid to be sealed against present in passageway 240 exerts an axially rearward pressure on the forward facing surface of block portion 246, while the fluid present in the passageway defined between support member 224 and block portion 246 directs an axially forward pressure on block portion 246.

The block and nose design of engagement member 212 allows the two axially directed pressures (i.e. rearward and frontward) exerted by the fluid to be sealed against upon the front and rear facing surfaces of block portion 246 to be substantially offset or equalized. They are offset because the fluid passageway extending along the rearwardly facing surface of block portion 246 extends radially inward only approximately to an extent equivalent to the radially inward extent of the front surface of block 246 which is ended by the outer periphery of nose portion 244. Because the fluid to be sealed against exerts axial pressures upon the rear and front surfaces of block portion 246 along substantially equal radially inward extending areas, these axial pressures are substantially offset from one another.

Likewise, the rearwardly directed axial pressure exerted on the front surface of block portion 246 by the barrier fluid in chamber 234 is substantially offset by the frontwardly directed axial pressure exerted on the rear surface of block portion 246 by the barrier fluid present in passageway 250 defined between support member 224 and the radially inward rear surface of block portion 246. Like the fluid to be sealed against present in the opposing passageway along the rear surface of block portion 246, the barrier fluid present in passageway 250 has its radially outward flow halted by the presence of rubber biasing member 248. Accordingly, the frontward and rearward axially directed fluid pressures exerted on block portion 246 of engaging member 212 are substantially equalized or offset due to the structural design of and fluid passageways surrounding engaging member 212.

As can be seen in FIG. 7, the radially inward and outward directed pressures exerted on nose portion 244 and block portion 246 of engaging member 212 are also substantially equalized or offset from one another. The fluid to be sealed against present in chamber 156 exerts an inwardly directed radial pressure along the radially outer surface of nose portion 244. This pressure created by the fluid to be sealed against is substantially offset by the radially outward directed pressure exerted on the nose portion by the barrier fluid present in chamber 234. In a similar manner, the fluid to be sealed against present in the axially extending portion of passageway 240 also imparts an inwardly directed radial pressure on block portion 246. This pressure is substantially offset by the radially outward directed pressure exerted on the inner periphery of block portion 246 by the barrier fluid disposed in chamber 234. Accordingly, both the radial and axial pressures directed by the different fluids on stationary engagement member 212 are substantially equalized and offset from one another.

The rotation of flange seal 208 along with flange 200 imparts a rearwardly directed axial pressure upon the front surface of nose portion 244. This axial pressure is substantially offset and equalized by the forwardly directed axial pressure exerted on the rear surface of block portion 246 by rubberized biasing member 248.

By equalizing and offsetting substantially all of the pressures directed upon engaging member 212 (and the other three annular engaging members), the position of engaging member 212 is kept substantially constant thereby maintaining the flat sealing engagement between the front surface of nose 244 and the rear surface of flange seal 208. If the block or nose portion of any stationary engaging member (or flange seal) is caused to tilt in any direction, ever so slightly, the planar sealing engagement between the front surface of nose portion 244 and the rear surface of seal 208 will break down and allow the fluid to be sealed against to seep therethrough. It is therefore important to offset and equalize the various fluid pressures exerted upon stationary engaging member 212 (and the other engaging members 214, 262, and 272) so that its axial and radial position relative to the other quad-seal elements is maintained.

The radial pressures directed upon flange seal 208 (and the other three flange seals) are substantially equalized/offset in a similar manner. Opposing passageways 207 are provided on each radial side of flange seal 208. Rubber members 230 stop the flow of fluid through these passageways and allow the radially directed pressure from one passageway to substantially offset the radial pressure exerted by the fluid in the other passageway 207.

The axial and radial pressures directed upon the radially inward stationary engaging member 214 are substantially equalized and offset in a similar fashion. The axially rearward directed pressure exerted upon the front surface of annular support band 228 is substantially offset by the axially forward directed pressure exerted upon the rearwardly facing surface of band 228 by the barrier fluid present in passageway 252. Passageway 252 is defined between the axially forward surface of annular spring support member 254 and the axially rearward facing surfaces of annular support band 228 and block portion 256.

Another annular fluid sealed chamber 260 circumferentially surrounding pump shaft 108 is disposed radially inward of stationary engaging member 214. Chamber 260 includes an elongated axially extending portion (passageway) defined between and interfacing the rear surface 206 of sealing flange 200 and the front surface of sealing flange 202. This elongated passageway of chamber 260 is substantially parallel to pump shaft 108 and communicates with the sealing surfaces of stationary engaging members 214 and 262. A barrier fluid may be selectively pumped into chamber 260 by way of a conduit (not shown) so as to maintain a pressure in chamber 260 which will substantially offset the pressure exerted by the barrier fluid (or fluid to be sealed against) in fluid sealed chamber 234.

The radially inward directed pressure on the outer peripheral surface of annular support band 228 by the fluid in chamber 234 is substantially equalized and offset by the radially outward directed pressure exerted upon the inner periphery of block portion 256 of engagement member 214 by the fluid of chamber 260 present in passageway 264 defined between the inner periphery of block portion 256 and the outer periphery annular support member 266.

Likewise, the radially inward directed pressure on nose portion 258 by the fluid in chamber 234 is substantially offset by the radially outward directed pressure exerted on the inner periphery of nose portion 258 by the fluid present in annular chamber 260 (assuming, of course, that the two fluids are at substantially the same pressure). The axial pressures exerted on block portion 256 are offset in a similar manner as those described above with respect to block portion 246 of engaging member 212. Also, the axial pressures placed upon engaging member 214 by rotating flange seal 210 and rubberized biasing member 270 substantially offset one another.

The other or axially rearward half of quad-seal 114 which is not shown in FIG. 7 includes stationary annular engaging members 262 and 272. The rear surfaces of the nose portions of engaging members 262 and 272 sealingly engage the rotating flange seals 274 mounted on the front surface of sealing flange 202. The arrangement of engaging members 262 and 272 and their respective diaphragms 220 and 221 relative to sealing flange 202 is an inverted replica of the front half of quad-seal 114 shown in FIG. 7. The difference being that the sealing surface of sealing flange 202 faces the wet end of pump 100, instead of the dry end faced by the sealing surface of flange 200.

Figure 8:
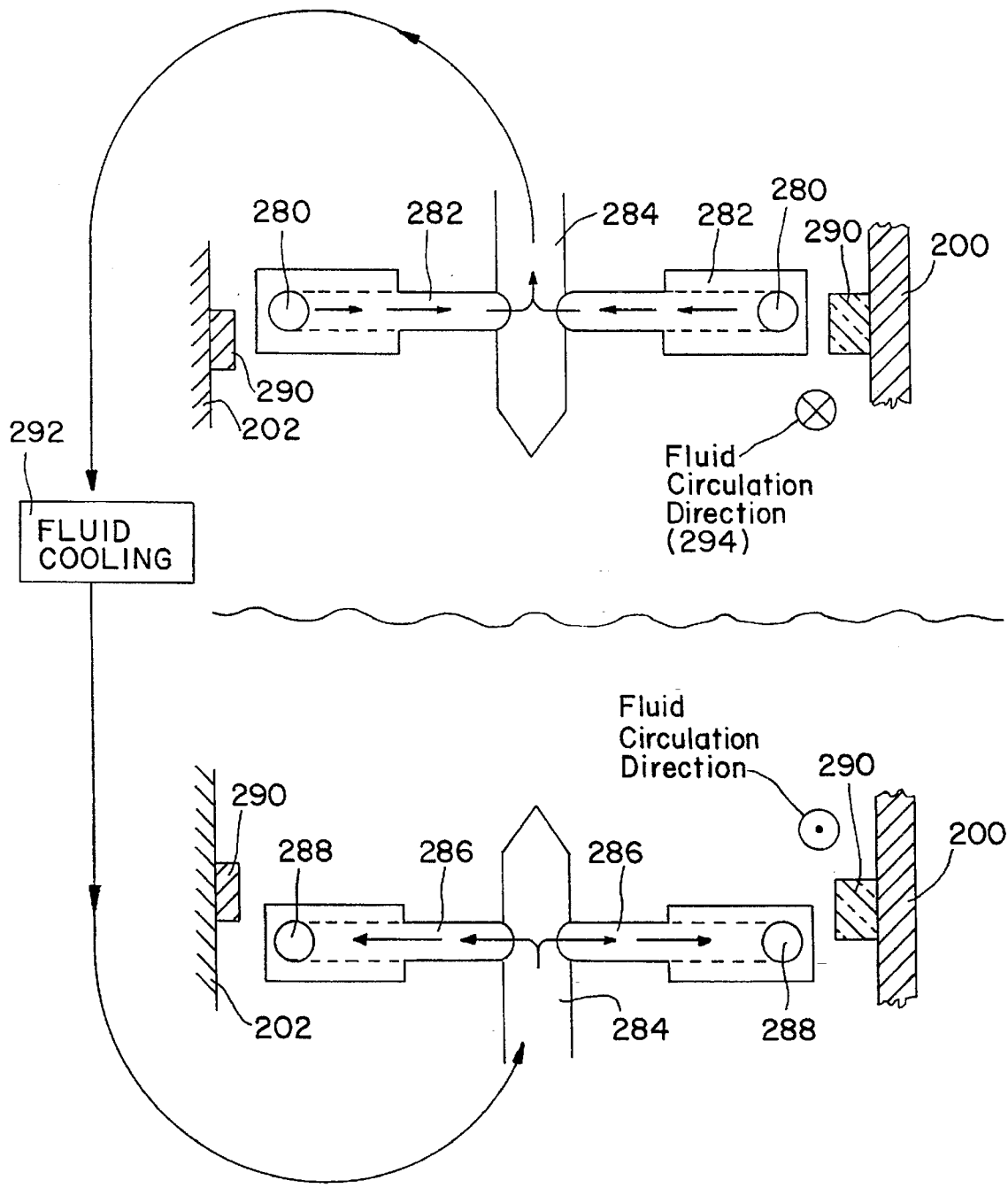
FIG. 8 is a schematic diagram illustrating the fluid circulation and cooling system of the quad-seal construction of FIG. 3.

Turning now to the temperature stabilizing aspect of the seal construction of this embodiment, the fluid preferably disposed within annular chamber 234 (and chamber 291) is maintained at a substantially constant temperature by way of a circulatory system including stationary chamber exit orifices 280, chamber exit conduits 282, circulatory conduits 284, chamber entry conduits 286, and chamber entry orifices 288 shown in FIGS. 3, 7, 8, and 9. As shown, chamber exit orifices 280 and chamber entry orifices 288 are defined in the periphery of exit and entrance conduits 282 and 286, respectively. Orifices 280 and 288 are disposed adjacent the longitudinal ends of their respective exit and entrance conduits 282 and 286, respectively, the orifices being positioned within annular chambers 234 and 290 disposed adjacent sealing flanges 200 and 202, respectively. As shown in FIGS. 3, 7, and 8, exit and entrance orifices 280 and 288, respectively, are arranged in chamber 234 (and 291) approximately 180° apart and facing the same direction, the direction in the aforesaid figures being out of the page. Because orifices 280 and 288 face the same direction, they face opposite flow directions within annular chambers 234 and 291.

Figure 9:
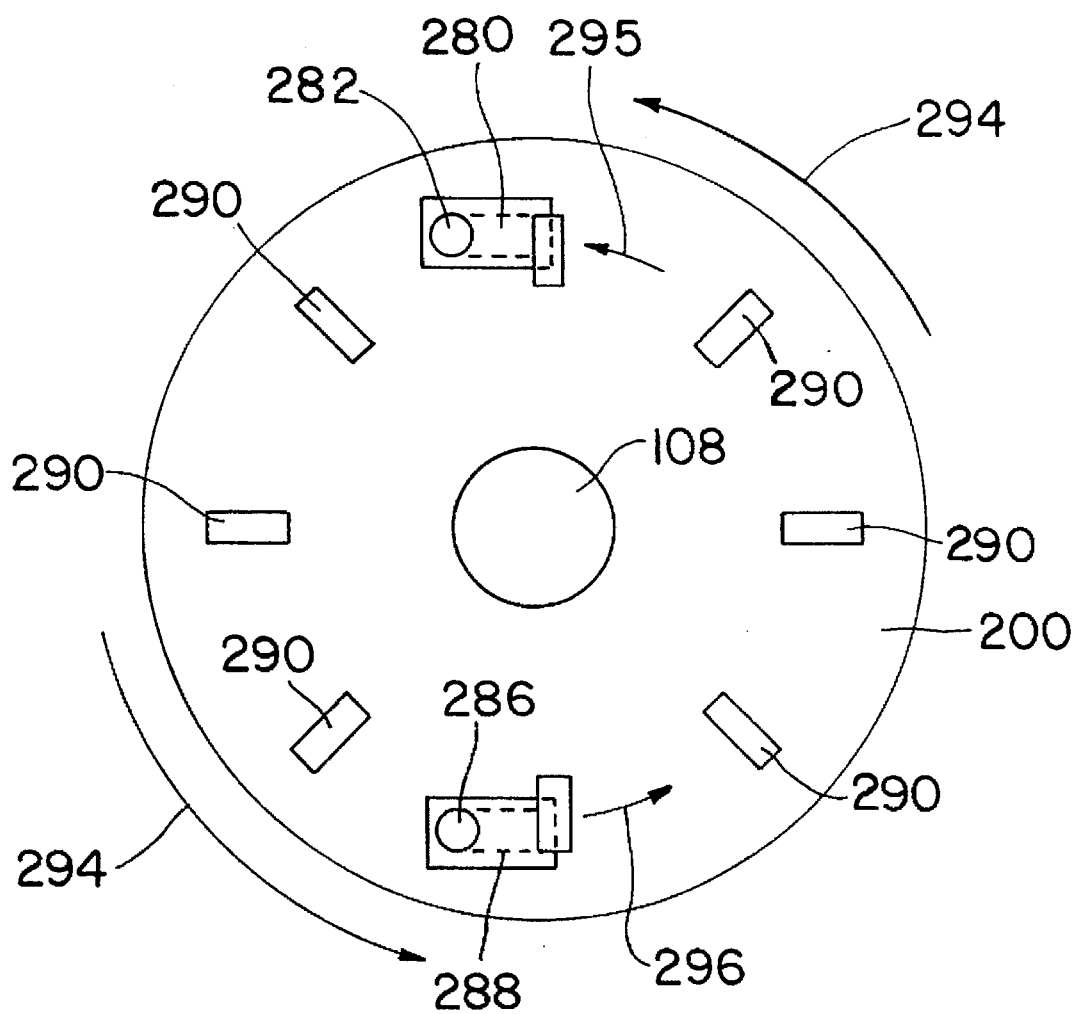
FIG. 9 is a rear elevational view of the forward rotating sealing flange of the pump of FIG. 3.

Another important component in the fluid circulating system of this embodiment is the disposition of vanes 290 on the sealing side surfaces of sealing flanges 200 and 202 as shown in FIGS. 7, 8, and 9. Vanes 290 are preferably integrally formed with sealing flanges 200 and 202. Alternatively, vanes 290 could be affixed to the sealing flanges by way of conventional screws, welds, etc.

Vanes 290 are provided on the rear radially extending surface of forwardmost sealing flange 200. The radial disposition of vanes 290 is between flange sealing members 208 and 210, or in other words, within annular fluid chamber 234. Therefore, the rotation of sealing flange 200 and vanes 290 thereon affects only the fluid present within chamber 234, not the fluid to be sealed against located in chamber 156.

Due to the rotation of vanes 290 in conjunction with pump shaft 108, the fluid present within annular chamber 234 is caused to flow circumferentially around pump shaft 108 through annular chamber 234. For example, as shown in FIGS. 3, 7, 8, and 9, if the sealing flanges 200 and 202, as viewed from the dry or motor end of the pump are rotated along with pump shaft 108 in a counterclockwise direction 294 (see FIG. 9), the preferably clean fluid present in chambers 234 and 291 will be forced by vanes 290 to flow circumferentially around pump shaft 108 through chamber 234 by vanes 290, also in the counterclockwise direction. In other words, the fluid adjacent exit orifices 280 will be forced to flow into the paper as shown in FIGS. 3, 7, and 8 by the rotation of vanes 290. Accordingly, the fluid within annular chamber 234 disposed adjacent the chamber entry orifices 288 will be forced to flow out of the paper as shown in FIGS. 3 and 8.

Because the openings of chamber exit orifices 280 face the counterclockwise fluid flow direction 294, when the fluid in chamber 234 is forced to move in this direction 294 it is forced into orifices 280 as illustrated by reference numeral 295 in FIG. 9. The continual rotation of sealing flanges 200 and 202 in the counterclockwise direction 294 as viewed from the motor end of the pump continually forces the fluid within chambers 234 and 291 into exit orifices 280. After being forced into orifices 280, the fluid is thereafter forced axially through chamber exit conduits 282 and radially outward through circulatory conduit 284. As shown in FIG. 8, circulatory conduit 284 has a conventional fluid cooling device 292 attached thereto, preferably at a location closely adjacent the pump. After leaving fluid chambers 234 and 291 by way of exit orifices 280, exit conduits 282, and circulatory conduit 284, the fluid is cooled by the cooling device 292 and is thereafter circulated by way of conduit 284 back into annular chambers 234 and 291 via entry conduits 286 and entry orifices 288. Because the openings of chamber entry orifices 288 face the clockwise flow direction, fluid flowing circumferentially in direction 294 through chambers 234 and 291 is not forced thereinto by vanes 290. In fact, the counterclockwise flow of fluid in chambers 234 and 291 creates a vacuum-type effect which draws the cooled fluid from chamber entry orifices 288. The fluid is forced or drawn therefrom as shown by arrow 296 in FIG. 9 back into chambers 234 and 291. In this manner, the temperature of the fluid within annular chambers 234 and 291 is maintained substantially constant thereby eliminating significant temperature fluctuations which have adverse effects on the sealing engagement of engaging members 212, 214, 262, and 272 with flange seals 208,210, and 274, respectively.

In a typical operation of the pump of the aforesaid embodiment shown in FIGS. 3–9, the fluid to be pumped and sealed against enters volute 128 by way of in-flow path 136. The impeller 110 forces most of the fluid out of volute 128 via out-flow path 138. However, a portion of the fluid being pumped inevitably slips behind back plate 141 of impeller 110 and enters passageway 154. Due to the centrifugal force created by impeller 110, the fluid to be sealed against present in passageway 154 makes its way axially rearward toward chamber 156 and motor 102 through the zig-zag configuration of passageway 154, most clearly shown in FIG. 6. A portion of the fluid entering passageway 154 is not repelled therefrom by the repeller assembly 112 including vanes 172 and channels 176. This portion of the fluid to be sealed against makes its way through passageway 154 proceeding past inwardly disposed back plates 132, 158, and 160 and past disk or flange members 164 and 166 of the repeller.

The portion of the fluid to be sealed against which makes it way through passageway 154 enters quad-seal chamber 156 and comes into contact with the front radially extending planar surface 204 of sealing flange 200. Flange 200 is coaxially affixed to pump shaft 108 and rotates therewith. The fluid to be sealed against proceeds radially outward along the front surface 204 of rotating flange 200 before reaching its outer periphery. Then, the fluid proceeds axially rearward toward motor 102 and thereafter moves radially inward along the back surface 206 of sealing flange 200. The fluid to be sealed against then reaches the first of four annular seals making up quad-seal arrangement 114.

The first annular rotating seal encountered by the fluid to be sealed against includes rotating flange seal 208 and stationary engaging member 212. The rotating rear surface of flange seal 208 forms a sealing engagement with the front surface of nose portion 244 of stationary engaging member 212. The seal formed therebetween blocks the radially inward flow of the fluid to be sealed against and forces the fluid to continue axially backward toward motor 102 along the outer radial surface of annular support 242.

The fluid to be sealed against then comes to neck portion 216 and proceeds radially inward therethrough coming into engagement with the outer periphery of flexible diaphragm 218. As the fluid pressure in chamber 156 increases due to the influx of the fluid to be sealed against, diaphragm 218 is forced to flex radially inward thereby imparting a larger force on the rear surface of spring support member 224 which in turn presses the front surface of nose portion 244 into a tighter sealing engagement with the rear surface of flange seal 208. In other words, diaphragm 218 determines the amount of force to be placed on the rearward surface of engaging member 212 by the fluid to be sealed against, diaphragm 218 being disposed in such a manner that an increase in pressure of the fluid to be sealed against upon the outer periphery of diaphragm 218 causes the diaphragm to flex radially inward thereby further urging the forward surface of engaging member 212 into sealing engagement with the rear surface of rotating seal 208.

L-shaped member 236 is positioned so as to limit the radially inward flexing of diaphragm 218 thereby limiting the amount of force which may be placed by the fluid to be sealed against upon diaphragm 218 and the rear surface of engaging member 212.

The fluid to be sealed against, upon reaching the radially outward annular surface of nose portion 244 will pass axially rearward therealong and radially outward through passageway 240 defined between engaging member 212 and support member 242. The fluid to be sealed against makes its way radially outward and axially rearward through passageway 240 until it reaches a position adjacent the front radially extending surface of support member 224. At this point, the fluid to be sealed against has nowhere to go but radially inward through a radially extending passageway defined between member 224 and the rear surface of block portion 246. The fluid's radially inward movement through this passageway is stopped by rubberized biasing member 248 at a radial extent substantially equivalent to the radial position of the top or radially outer surface of nose portion 244.

Therefore, the pressure exerted on the rear surface of engaging member 212 and block portion 246 thereof by the fluid to be sealed against present in chamber 156 is substantially offset by the axially rearward directed pressure exerted on the front surface of block portion 246 in passageway 240 by the fluid to be sealed against. In other words, the pressures directed on engaging member 212 in the axial directions by the fluid to be sealed against substantially offset one another. The radially inward pressure exerted on the radially outer peripheral surface of band member 226 is substantially offset by the radially outward directed pressure exerted on the radially inward peripheral surface of block portion 246 by the fluid (preferably clean barrier fluid) disposed in chamber 234.

Also, if chamber 234 was vacant, due to the pressure exerted along the full axial length and full outer circumference of members 226 and 244, this design provides even loading. In other words, there is no cantilever effect.

Furthermore, the axially rearward pressure directed on the front surface of nose portion 244 by the rotational engagement with the rear surface of seal 208 is substantially offset and equalized by the axially forward biasing force placed upon the rear surface of block portion 246 by rubber biasing member 248. Similar oval-shaped rubber biasing members perform the same function with respect to the other three annular stationary engaging members 214, 262, and 272.

Clean barrier fluid is selectively pumped into chamber 234 (and chamber 291) by way of circulating conduit 284, conduit 282, and orifice 280. The barrier fluid is preferably maintained at a pressure which allows it to substantially offset the radially and axially directed pressures created by the fluid to be sealed against in chamber 156 upon engaging member 212 and diaphragm 218.

After the barrier fluid is initially pumped into chamber 234, the amount and pressure of the barrier fluid is substantially maintained, and the temperature of the barrier fluid is substantially maintained by circulating it to and from the chamber 234 by way of chamber exit orifice 280 and chamber entrance orifice 288. Vanes 290 affixed to the rear surface of rotating sealing flange 200 create a fluid flow (circumferentially around pump shaft 108) of the barrier fluid through annular chamber 234 in either the clockwise or counterclockwise direction, depending upon which direction pump shaft 108 is rotated. If, for example, pump shaft 108 is rotated in a counterclockwise direction as viewed from the motor or dry end of the pump, the clean fluid within chamber 234 is forced to flow in the counterclockwise direction 294 through chamber 234 (and chamber 291 if fluid is present therein) circumferentially around pump shaft 108. If the barrier fluid is forced to rotate in such a counterclockwise manner, orifice 280 becomes the chamber exit orifice because the fluid is forced directly into orifice 280 as indicated by reference numeral 295 in FIG. 9, and out of chamber 234 by way of conduit 282.

Likewise, because the counterclockwise fluid flow 294 in chamber 234 does not force fluid into orifice 288, this orifice becomes the chamber entry orifice, with the fluid in the circulating system including conduits 282, 284, and 286 being drawn back into chamber 234 as indicated by reference numeral 296 in FIG. 9 by the vacuum created around orifice 288 by the chamber fluid flow. Optionally, a pump (not shown) may be provided in conduit 284 for forcing the chamber 234 (and 291) fluid to and from the chamber via conduits 282, 284, and 286.

The temperature of the fluid within chamber 234 is maintained substantially constant by forcing the fluid therein out of the chamber by way of exit orifice 280 and conduit 282. The fluid enters circulating conduit 284 and proceeds to a location remote from chamber 234 where the fluid within conduit 284 is cooled (see reference numeral 292). After being cooled, the fluid continues through conduit 284 until it reaches chamber entry conduit 286 through which the fluid proceeds and reenters chamber 234 by way of entry orifice 288. In such a manner, the temperature of the rotating seals between flange sealing members 208 and 210 and corresponding stationary engaging members 212 and 214, respectively, is maintained thereby preserving the flatness associated with the sealing surfaces of these members, preferably to a tolerance of about two helium light bands (0.000023 inches) or less.

In the event that the fluid to be sealed against leaks through the first rotating seal made up of flange sealing member 208 and stationary engaging member 212, and makes its way into fluid chamber 234, the circulating fluid system for maintaining the temperature of the clean fluid in chamber 234 may be deactivated if desired. If such a leaking occurs, annular chamber 260 may then be filled with a barrier fluid maintained at a pressure to substantially offset the axial and radial pressures directed on stationary engaging member 214 by the fluid to be sealed against present in chamber 234. Chamber 260 may, of course, be filled with such a fluid even if the fluid to be sealed against has not leaked into chamber 234. For purposes of simplicity, the conduit for allowing fluid to enter chamber 260 is not shown, however, this conduit is attached to circulatory conduit 284 at its radially inner longitudinal end and interfaces conduit 284 with the central longitudinal portion of elongated chamber/passageway 260.

Optionally, a temperature stabilizing circulatory system similar to the one discussed above may be provided in chamber 260 with the vanes affixed to the pump shaft side of the chamber.

If the fluid to be sealed against happens to leak through both rotating seals shown in FIG. 7, namely the two seals maintained by stationary engaging members 212 and 214, and into elongated chamber 260, the next rotating seal the fluid to be sealed against will encounter includes stationary engaging member 262 and the radially innermost rotating seal 274 affixed to the front surface of sealing flange 202.

Of all of the rotating annular seals formed by stationary engaging members 212, 214, 262, and 274, the annular seal including stationary engaging member 262 is the least sensitive to pump vibration. The reason for this is the disposition of double row bearings 124 closely adjacent flange sealing member 274 and stationary engaging member 262. Stationary engaging member 262 is less sensitive to vibration than its adjacent engaging member 272 because the sealing engagement between flange seal 274 and engaging member 262 is radially closer to pump shaft 108. Therefore, pump shaft vibration affects the radially inner seal to a lesser extent than the outer seal including engaging member 272.

Accordingly, the seal maintained between the rear surface of the nose portion of engaging member 262 and the front surface of flange seal 274 is the most efficient of the four quad-seal rotating seals. The fluid chamber 291 disposed radially between stationary engaging members 262 and 272 is identical in nature to chamber 234, except that it is inverted with respect thereto. The temperature of the preferably clean barrier fluid within chamber 291 is maintained substantially constant as discussed above with respect to chamber 234. As shown in FIG. 8, if pump shaft 108 is rotating in a counterclockwise direction 294 as viewed from the motor end of the pump, orifice 280 adjacent sealing flange 202 acts as the chamber 291 exit orifice and orifice 288 adjacent flange 202 becomes the chamber 291 entrance orifice. If, however, pump shaft 108 is rotating in a clockwise direction as viewed from the motor end of the pump, orifices 288 adjacent flanges 200 and 202 become the chamber exit orifices, orifices 280 becoming the chamber entry orifices due to the fact that orifice 280 and 288 face opposing chamber flow directions.

As is the case with chamber 234, chamber 291, disposed between stationary engaging members 262 and 272, may be filled with clean fluid to be maintained at a pressure designed to substantially offset the axial and radial pressures directed upon engaging member 262 from the fluid present in chamber 260. The preservation of substantially equivalent pressures in chamber 260 and adjacent engaging member chambers 234 and 291 allows the flatness associated with the interface between flange seals 274, 208, 210 and stationary engaging members 212, 214, 262, 272 to be maintained to the aforesaid tolerance.

Figure 10:
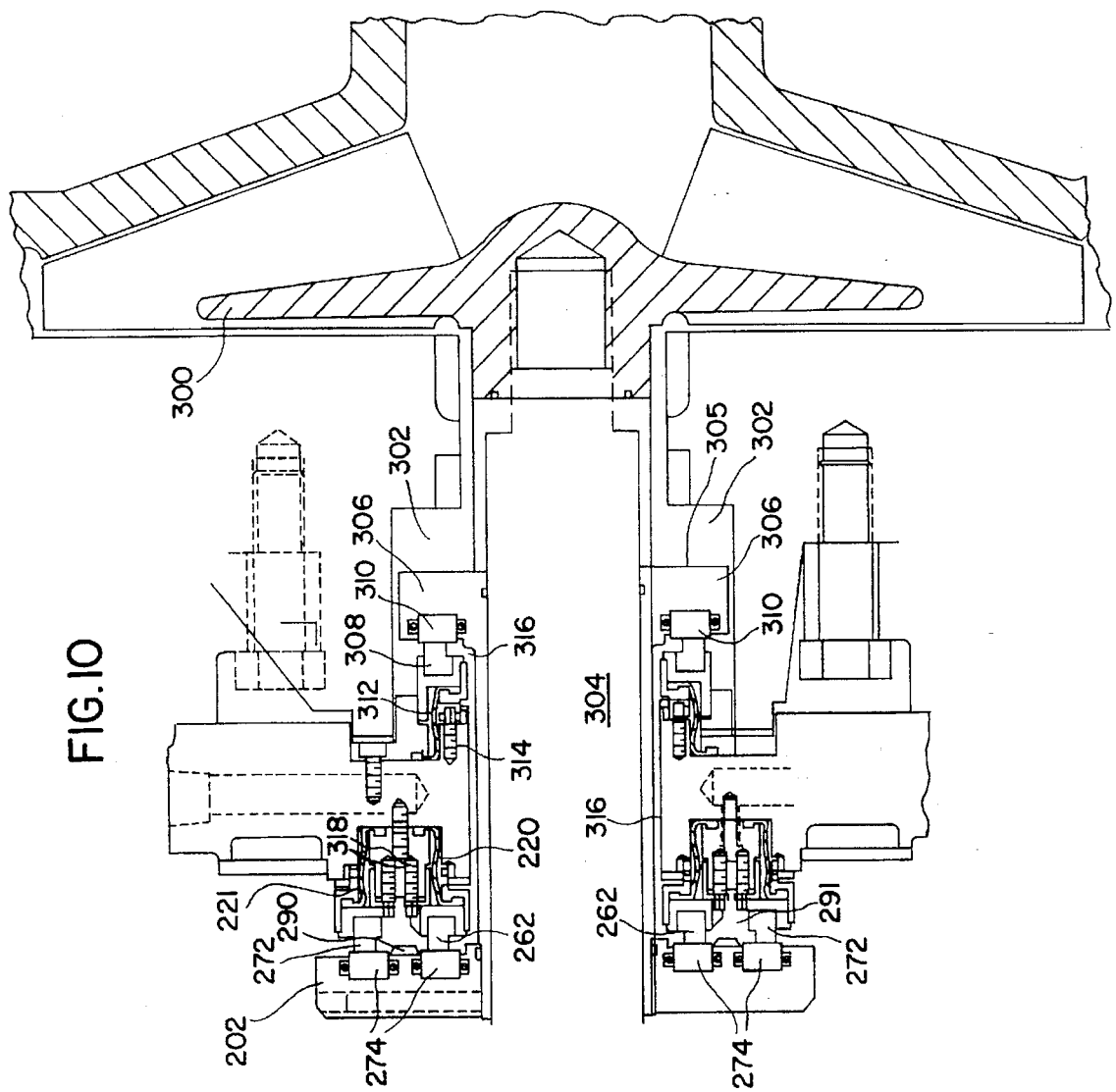
FIG. 10 is a longitudinal partial cross-sectional view of a pump including a seal construction according to another embodiment of this invention.

FIG. 10 is a longitudinal cross-sectional view of a pump seal construction according to another embodiment of this invention. Instead of the aforesaid quad-seal arrangement, this embodiment utilizes a tri-seal arrangement including three rotating seals.

If the fluid being pumped and to be sealed against leaks past repeller assembly 300 into annular seal chamber 302, it eventually reaches the front surface 305 of rotating sealing flange 306. The fluid to be sealed against flows radially outward along the front surface 305 of sealing flange 306 and then proceeds axially rearward eventually reaching the sealing interface between stationary annular engaging member 308 and rotating annular flange seal. 310 which is affixed to sealing flange 306.

Diaphragm 312 functions in a manner substantially similar to the diaphragms (namely, diaphragm 218) of the previous embodiment of this invention in that it dictates the amount of pressure to be placed upon the rear surface of stationary engaging member 308, thereby determining the force applied to the sealing interface between sealing members 308 and 310. Spring 314 acts as a continual or constant biasing member for urging the front surface of engaging member 308 into sealing contact with the rear surface of flange seal 310.

If the fluid to be sealed against leaks through the first rotating seal made up of elements 308 and 310, it makes it way into elongated passageway 316 which is substantially parallel to pump shaft 304. Passageway 316 is, of course, annular in nature and circumferentially surrounds pump shaft 304. In the event that the fluid to be sealed against leaks through the first seal and flows axially rearward through chamber/passageway 316, it reaches the front surface of rear sealing flange 202. As indicated by the reference numerals in FIG. 10, the two adjacent rear seals made up of flange sealing members 274 and stationary engaging members 262 and 272 are identical in nature to the rear rotating seals of the aforesaid embodiment of this invention. As in the previous embodiment, stationary engaging members 262 and 272 are urged into sealing engagement with flange seal members 274 by springs 318 which act as normal and continual biasing means.

The embodiment of FIG. 10 takes advantage of the fact that the rear radially inward seal made up of engaging member 262 and flange member 274 is the most efficient seal in the system, for the reasons discussed above. Therefore, the forward radially outward seal of the previous embodiment has been eliminated as shown in FIG. 10. This allows the seal construction to be packaged in a substantially smaller housing without sacrificing much in the way of sealing efficiency against the fluid to be sealed against. The circulating/cooling system including vanes 290, entry and exit orifices, etc. of this embodiment is identical to that of the axially rearward circulating system disposed between engaging members 262 and 272 of the previous embodiment.

The above-described and illustrated elements of the various embodiments of this invention are manufactured and connected to one another by conventional methods commonly used throughout the art.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A seal construction for sealing a rotating shaft against passage of a fluid to be sealed against along said rotating shaft, said seal construction comprising:

first and second rotatable sealing flanges each fixedly mounted on said shaft and rotatable therewith about a central axis of said shaft, said first and second sealing flanges each having a forward and a rear surface, each of said surfaces extending in a generally radial direction with respect to said central axis, said forward surface of said first rotatable sealing flange to be exposed to the fluid to be sealed against;

a first stationary sealing means for creating a fluid seal between said rear surface of said first rotatable sealing flange and said first stationary sealing means, said first stationary sealing means comprising: a first engaging member having a forward surface located for sealing engagement with said rear surface of said first sealing flange, said first engaging member being spaced radially outwardly from and extending circumferentially around said rotating shaft; and a first biasing means for normally urging said forward surface of said first engaging member into sealing engagement with said rear surface of said first sealing flange;

a second stationary sealing means for creating a fluid seal between said front surface of said second rotatable sealing flange and said second stationary sealing means, said second stationary sealing means comprising: a second engaging member having a rear surface located for sealing engagement with said front surface of said second sealing flange, said second engaging member being spaced radially outwardly from and extending circumferentially around said rotating shaft; and a second biasing means for normally urging said rear surface of said second engaging member into sealing engagement with said front surface of said second sealing flange;

a first annular fluid passageway extending between and interfacing said first and second stationary sealing means, said first annular fluid passageway being substantially parallel to said central axis and being located radially inward from said first and second stationary sealing means, whereby said first annular fluid passageway is disposed between said central axis and said first and second stationary sealing means; and a stationary gland disposed between said first and second stationary sealing means, said gland including first, second, third, and fourth fluid passages defined therein, said first and second gland passages being in communication with a first barrier chamber disposed radially outward of said first engaging member and said third and fourth gland passages in communication with a second barrier chamber located radially outward of said second engaging member, wherein said first and second gland passages allow a barrier fluid to be circulated to and from said first barrier chamber and said second and third gland passages enable barrier fluid to be circulated to and from said second barrier chamber.

2. The seal construction of claim 1, further comprising a second annular fluid passageway communicating said fluid to be sealed against with the radially outward side of a first flexible diaphragm, said first diaphragm determining the amount of force placed on a rearward surface of a third engaging member by said fluid to be sealed against, wherein said first diaphragm is disposed such that an increase in pressure of said fluid to be sealed against upon said first diaphragm will cause said first diaphragm to flex radially inward, thereby increasing the surface area of said rearward surface of said third engaging member exposed to the pressure of said fluid to be sealed against, whereby the net effect of said radially inward flexing of said first diaphragm is to further urge said forward surface of said third engaging member into sealing engagement with said rear surface of said first sealing flange; and wherein said second stationary sealing means includes a second diaphragm determining the amount of force placed on a front surface of said second engaging member by a fluid adjacent said second diaphragm.

3. The seal construction of claim 2, wherein said first stationary sealing means further comprises:

said third engaging member having a forward surface located for sealing engagement with said rear surface of said first sealing flange, said third engaging member being spaced radially outwardly from and extending circumferentially around said rotating shaft.

4. The seal construction of claim 3, further comprising said first barrier chamber disposed radially between said first and third engaging members, and orifice means in said gland communicating with said first barrier chamber for providing a barrier fluid under pressure into said first barrier chamber at a pressure which may be used to control the amount and direction of flexing of said first diaphragm.

5. The seal construction of claim 1, further comprising a plurality of vanes disposed on a rear sealing surface of said first sealing flange in said first barrier chamber.

6. The seal construction of claim 5, wherein said vanes, when rotated along with said first sealing flange, impart a circumferential flowing motion to a barrier fluid adjacent said vanes, said vanes causing said fluid to enter a stationary exit orifice and flow through a recirculating system wherein said fluid is cooled and thereafter said fluid flows out of a stationary entrance orifice also adjacent said vanes in said first barrier chamber thereby stabilizing the temperature of said fluid and said sealing interface between said first engaging member and said first sealing flange.

7. The seal construction of claim 6, wherein said exit orifice faces the direction of said circumferential flowing motion imparted by said vanes thereby allowing said fluid to flow directly into said exit orifice as a result of said flowing motion.

8. The seal of construction of claim 7, wherein said entrance and exit orifices are substantially parallel to one another and face substantially the same chamber flow direction, whereby no matter what direction said vanes cause said fluid to flow, clockwise or counterclockwise, one of said orifice faces the direction of said flow thereby defining the exit orifice and the other orifice faces the direction opposite said flow thereby defining the entrance orifice.

9. The seal construction of claim 1, wherein said first engaging member includes a nose portion whose front surface sealingly engages said rear surface of said first sealing flange, a block portion integrally formed with said nose portion for stabilizing said nose portion in the radial and axial directions against pressure changes, and a circumferential stiffening band member circumferentially surrounding said block portion and stabilizing said block portion and said nose portion against pressure exerted against them in the radially outward direction.

10. The seal construction of claim 9, further comprising outer fluid passageway means adjacent said block portion for allowing said fluid to be sealed against to bear against a forward surface of said block portion only to a predetermined radially inward extent defined by a radially outer edge of said nose portion, said outer fluid passageway means also for allowing said fluid to be sealed against to bear against a rear surface of said block portion only to approximately said predetermined radially inward extent, the net effect of said outer fluid passageway means adjacent said block portion being to substantially equalize and offset the pressures exerted on said block portion radially outward of said predetermined radially inward extent by said fluid to be sealed against in the forward and rearward axial directions.

11. A pump including the seal construction of claim 1, said pump further comprising a motor with said rotatable shaft attached thereto, and an impeller for pumping and expelling said fluid to be pumped and sealed against.

12. A seal arrangement adapted to be positioned along a rotating shaft in a pump, the seal arrangement comprising:

first, second, and third annular sealing assemblies, each of said annular sealing assemblies including a rotating and a stationary annular sealing member for defining a fluid seal therebetween;

said second and third sealing assemblies being concentric with one another and said first sealing assembly being axially spaced along the rotating shaft from said second and third sealing assemblies;

a first annular barrier chamber for being filled with a barrier fluid defined radially between said second and third sealing assemblies;

a second annular barrier chamber for being filled with a barrier fluid defined adjacent said first sealing assembly;

a first rotating flange affixed to the shaft for rotation therewith, said first flange including means for forming the rotating annular sealing member of said first annular sealing assembly;

a second flange affixed to the shaft for rotation therewith, said second flange including means for forming the rotating annular sealing members for said second and third annular sealing assemblies, said first annular barrier chamber being adjacent said second flange and said second annular barrier chamber being adjacent said first flange;

pumping means attached to said second flange within said first barrier chamber for forcing barrier fluid to and from said barrier chamber when the shaft is rotated; and a stationary gland disposed along the shaft and between the first and second barrier chambers, said gland including first, second, third, and fourth passages defined therein, said first and second gland passages being in communication with said first barrier chamber and said third and fourth gland passages being in communication with said second barrier chamber for allowing barrier fluid to be pumped to and from said first and second barrier chambers respectively.

* * * * *